United States Patent
Liu et al.

(10) Patent No.: US 8,219,574 B2
(45) Date of Patent: Jul. 10, 2012

(54) QUERYING COMPRESSED TIME-SERIES SIGNALS

(75) Inventors: Jie Liu, Sammamish, WA (US); Suman Kumar Nath, Redmond, WA (US); Feng Zhao, Issaquah, WA (US); Galen Andrew Reeves, Berkley, CA (US); Sorabh Kumar Gandhi, Santa Barbara, CA (US)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 12/488,598

(22) Filed: Jun. 22, 2009

(65) Prior Publication Data
US 2010/0325132 A1  Dec. 23, 2010

(51) Int. Cl.
G06F 7/00 (2006.01)
G06F 17/30 (2006.01)

(52) U.S. Cl. ............................ 707/759; 707/765
(58) Field of Classification Search .................. 707/713, 707/759–766, 769–779
See application file for complete search history.

(56) References Cited

U.S. PATENT DOCUMENTS

| | | | | |
|---|---|---|---|---|
| 5,708,693 | A * | 1/1998 | Aach et al. ........................ | 378/62 |
| 6,536,284 | B2 * | 3/2003 | Bonanni .......................... | 73/660 |
| 6,691,090 | B1 * | 2/2004 | Laurila et al. ................... | 704/250 |
| 7,020,701 | B1 | 3/2006 | Gelvin et al. | |
| 7,072,429 | B1 * | 7/2006 | Sogo .............................. | 375/350 |
| 2001/0003527 | A1 * | 6/2001 | Shinohara et al. .............. | 370/521 |
| 2002/0184951 | A1 * | 12/2002 | Bonanni .......................... | 73/660 |
| 2003/0121330 | A1 * | 7/2003 | Muhle et al. .................... | 73/600 |
| 2004/0034633 | A1 | 2/2004 | Rickard | |
| 2004/0243328 | A1 * | 12/2004 | Rapp et al. ...................... | 702/71 |
| 2006/0106832 | A1 | 5/2006 | Ben-Dyke et al. | |
| 2007/0087756 | A1 | 4/2007 | Hoffberg | |
| 2007/0147519 | A1 * | 6/2007 | Takayama et al. .............. | 375/246 |
| 2007/0150267 | A1 * | 6/2007 | Honma et al. ................... | 704/225 |
| 2008/0036593 | A1 | 2/2008 | Rose-Pehrsson et al. | |
| 2008/0215546 | A1 | 9/2008 | Baum et al. | |
| 2008/0263114 | A1 | 10/2008 | Nath et al. | |
| 2009/0055422 | A1 | 2/2009 | Williams et al. | |
| 2009/0077148 | A1 * | 3/2009 | Yu et al. ......................... | 708/300 |
| 2009/0156659 | A1 * | 6/2009 | Butters et al. ................... | 514/449 |

OTHER PUBLICATIONS

Lazaridis, et al., "Capturing Sensor-Generated Time Series with Quality Guarantees", Retrieved at <<http://ieeexplore.ieee.org/stamp/stamp.jsp?arnumber=01260811>>, Proceedings of the 19th International Conference on Data Engineering, Mar. 5-8, 2003, pp. 429-440.

Kahveci, et al., "Variable Length Queries for Time Series Data", Retrieved at <<http://citeseerx.ist.psu.edu/viewdoc/download;jsessionid=7C37AF9B5821FD9E9CA3C023E68EC875?doi=10.1.1.21.6837&rep=rep1&type=pdf>>, In proceedings of 17th International Conference on Data Engineering, 2001, pp. 1-10.

Nath, Suman, "Energy Efficient Sensor Data Logging with Amnesic Flash Storage", Retrieved at <<http://research.microsoft.com/en-us/projects/senseweb/main.pdf>>, The 8th ACM/IEEE International Conference on Information Processing in Sensor Networks, Apr. 13-16, 2009, pp. 1-13.

(Continued)

*Primary Examiner* — Kuen Lu
*Assistant Examiner* — Tuan A Pham

(57) ABSTRACT

A system described herein includes a receiver component that receives a query that pertains to a raw time-series signal. A query executor component selectively executes the query over at least one of multiple available compressed representations of the raw time-series signal, wherein the query pertains to at least one of one of determining a trend pertaining to the raw time-series signal, generating a histogram pertaining to the raw time-series signal, or determining a correlation pertaining to the raw time-series signal.

15 Claims, 15 Drawing Sheets

OTHER PUBLICATIONS

Abadi, et al., "The Design of the Borealis Stream Processing Engine", Retrieved at <<http://www.cs.brown.edu/research/borealis/public/publications/cidr05.pdf>>, Second Biennial Conference on Innovative Data Systems Research, Jan. 2005, pp. 1-13.

Achlioptas, Dimitris, "Database-Friendly Random Projections", Retrieved at <<http://www.sigmod.org/pods/proc01/online/p93.pdf>>, Proceedings of the twentieth ACM SIGMOD-SIGACT-SIGART symposium on Principles of database systems, 2001, pp. 1-8.

Aguilera, et al., "Performance Debugging for Distributed Systems of Black Boxes", Retrieved at <<http://pdos.csail.mit.edu/~athicha/papers/blackboxes:sosp03.pdf>>, Proceedings of the nineteenth ACM symposium on Operating systems principles, Oct. 19-22, 2003, pp. 1-16.

Bingham, et al., "Random Projection in Dimensionality Reduction: Applications to Image and Text Data", Retrieved at <<http://www.cis.hut.fi/ella/publications/randproj_kdd.pdf>>, Proceedings of the seventh ACM SIGKDD international conference on Knowledge discovery and data mining, Aug. 26-29, 2001, pp. 1-6.

Cole, et al., "Fast Window Correlations over Uncooperative Time Series", Retrieved at <<http://www.cs.nyu.edu/cole/papers/uncoop-series.pdf>>, Proceedings of the eleventh ACM SIGKDD international conference on Knowledge discovery in data mining, Aug. 21-24, 2005, pp. 7.

Cormode, et al., "Fast Mining of Massive Tabular Data via Approximate Distance Computations", Retrieved at <<http://dimacs.rutgers.edu/~graham/pubs/papers/tabular.pdf>>, Proceedings of the 18th International Conference on Data Engineering, Feb. 26-Mar. 1, 2002, pp. 1-10.

Donoho, David L., "Compressed Sensing", Retrieved at <<http://www-stat.stanford.edu/~donoho/Reports/2004/CompressedSensing091604.pdf>>, Sep. 14, 2004, pp. 1-34.

Fan, et al., "Power Provisioning for a Warehouse-Sized Computer", Retrieved at <<http://research.google.com/archive/power_provisioning.pdf>>, In Proceedings of the ACM International Symposium on Computer Architecture, Jun. 9-13, 2007, pp. 1-11.

Fern, et al., "Random Projection for High Dimensional Data Clustering: A Cluster Ensemble Approach", Retrieved at <<http://www.hpl.hp.com/conferences/icml2003/papers/237.pdf>>, Proceedings of the Twentieth International Conference on Machine Learning, Aug. 21-24, 2003, pp. 1-8.

Gandhi, et al., "GAMPS: Compressing Multi Sensor Data by Grouping and Amplitude Scaling", Retrieved at <<http://research.microsoft.com/pubs/79801/sigmod069-gandhi.pdf>>, ACM SIGMODS/PODS Conference: Providence, Jun. 29-Jul. 2, 2009, pp. 1-14.

Haupt, et al., "Signal Reconstruction from Noisy Random Projections", Retrieved at <<http://www.ece.wisc.edu/~nowak/infth.pdf>>, Mar. 2005, pp. 1-29.

Indyk, et al., "Identifying Representative Trends in Massive Time Series Data Sets Using Sketches", Retrieved at <<http://www.vldb.org/conf/2000/P363.pdf>>, Proceedings of the 26th International Conference on Very Large Data Bases, Sep. 10-14, 2000, pp. 363-372.

Indyk, et al., "Approximate Nearest Neighbors: Towards Removing the Curse of Dimensionality", Retrieved at <<http://portal.acm.org/ft_gateway.cfm?id=276876&type=pdf&coll=GUIDE&dl=GUIDE&CFID=32485641&CFTOKEN=67635465>>, Proceedings of the thirtieth annual ACM symposium on Theory of computing, May 24-26, 1998, pp. 604-613.

Lu, et al., "Counter Braids: A Novel Counter Architecture for Per-Flow Measurement", Retrieved at <<http://www.google.co.in/url?q=http://simula.stanford.edu/luyi/sigmetrics08_final.pdf&ei=dgf4SdKJFYu7jAe8jeXRDA&sa=X&oi=spellmeleon_result&resnum=1&ct=result&usg=AFQjCNEIEAYL8FU44jEiN1Rbs9m5jcG0jQ>>, Proceedings of the 2008 ACM SIGMETRICS international conference on Measurement and modeling of computer systems, Jun. 2-6, 2008, pp. 1-12.

Menon, et al., "An Incremental Data-Stream Sketch using Sparse Random Projections", Retrieved at <<http://www.siam.org/proceedings/datamining/2007/dm07_062Menon.pdf>>, Proceedings of the Seventh SIAM International Conference on Data Mining, Apr. 26-28, 2007, pp. 563-568.

Papadimitriou, et al., "Streaming Pattern Discovery in Multiple Time-Series", Retrieved at <<http://www.vldb2005.org/program/paper/thu/p697-papadimitriou.pdf>>, Proceedings of the 31st VLDB Conference, Aug. 30-Sep. 2, 2005, pp. 697-708.

Sakurai, et al., "Braid: Stream Mining through Group Lag Correlations", Retrieved at <<http://www.google.co.in/url?q=http://www.cs.cmu.edu/~christos/PUBLICATIONS/sigmod05-braid.pdf&ei=2Bf4SaShMc3MjAffwqDEDA&sa=X&oi=spellmeleon_result&resnum=1&ct=result&usg=AFQjCNHourN63Y8eKA9JFkX_IQHRJl2ow>>, Proceedings of the 2005 ACM SIGMOD international conference on Management of data, Jun. 14-16, 2005, pp. 1-12.

Zhu, et al., "Statstream: Statistical Monitoring of Thousands of Data Streams in Real Time", Retrieved at <<https://eprints.kfupm.edu.sa/66868/1/66868.pdf>>, Proceedings of the 28th international conference on Very Large Data Bases, Aug. 20-23, 2002, pp. 1-19.

Shieh, et al., "iSAX: Indexing and Mining Terabyte Sized Time Series", Retrieved at http://www.cs.ucr.edu/~eamonn/iSAX.pdf>>, Proceeding of the 14th ACM SIGKDD international conference on Knowledge discovery and data mining, Aug. 24-27, 2008, pp. 1-9.

Thaper, et al., "Dynamic Multidimensional Histograms", Retrieved at <<http://people.csail.mitedu/indyk/thaper.pdf>>, Proceedings of the 2002 ACM SIGMOD international conference on Management of data, Jun. 3-6, 2002, pp. 428-439.

Thiagarajan, et al., "Querying Continuous Functions in a Database System", Retrieved at <<http://portal.acm.org/ft_gateway.cfm?id=1376696&type=pdf&coll=GUIDE&d=GUIDE&CFID=32496860&CFTOKEN=48138654>>, Proceedings of the 2008 ACM SIGMOD international conference on Management of data, Jun. 9-12, 2008, pp. 791-804.

Vlachos, et al., "Indexing Multidimensional Time-Series", Retrieved at <<http://portal.acm.org/ft_gateway.cfm?id=1146467&type=pdf&coll=GUIDE&dl=GUIDE&CFID=32498250&CFTOKEN=47454781>>, The VLDB Journal—The International Journal on Very Large Data Bases, vol. 15, No. 1, Jan. 2006, pp. 1-20.

Xue, Feng, "Efficient Similarity Search in Sequence Databases", Retrieved at <<http://www.cs.uwaterloo.ca/~david/cs848/presentation-similarity-fengxue.pdf>>, CS 860 Topics in Database Systems, Paper Presentation Summary, pp. 1-7.

Buragohain, et al., "Space Efficient Streaming Algorithms for the Maximum Error Histogram", Retrieved at <<http://ieeexplore.ieee.org/stamp/stamp.jsp?tp=&isnumber=4221635&arnumber=4221751>>, IEEE 23rd International Conference on Data Engineering, Apr. 15-20, 2007, pp. 1026-1035.

Chan, et al., "Efficient Time Series Matching by Wavelets", Retrieved at <<http://infolab.usc.edu/csci599/Fall2003/Time%20Series/Efficient%20Time%20Series%20Matching%20by%20Wavelets.pdf>>, In proceedings of the 15th International Conference on Data Engineering, Mar. 23-26, 1999, pp. 1-8.

Chen, et al., "Indexable PLA for Efficient Similarity Search", Retrieved at <<http://www.vldb.org/conf/2007/papers/research/p435-chen.pdf>>, Proceedings of the 33rd international conference on Very large data bases, Sep. 23-28, 2007, pp. 435-446.

Chu, et al., "Fast Time-Series Searching With Scaling and Shifting", Retrieved at <<http://infolab.usc.edu/csci599/Fall2002/paper/A5_p237-chu.pdf>>, Proceedings of the eighteenth ACM SIGMOD-SIGACT-SIGART symposium on Principles of database systems, May 31-Jun. 3, 1999, pp. 237-248.

Bulusu, et al., "RIDA: A Robust Information-Driven Data Compression Architecture for Irregular Wireless Sensor Networks", Retrieved at <<http://209.85.229.132/search?q=cache:tafS-rJd6_gJ:web.cecs.pdx.edu/~nbulusu/talks/EWSN-RIDA.ppt+A+robust+information-driven+data+compression+architecture+for+irregular+wireless+sensor+networks&cd=1&hl=en&ct=clnk&gl=in>>, Apr. 29, 2009, pp. 1-24.

Datar, et al., "Estimating Rarity and Similarity Over Data Stream Windows", Retrieved at <<http://209.85.229.132/search?q=cache:GxDrRVsxs9wJ:www.cs.tau.ac.il/~matias/courses/Seminar_Spring03/Estimating%2520Rarity%2520and%2520Similarity%2520over%2520Data%2520stream%

2520Windows.ppt+Estimating+rarity+and+similarity+over+data+stream+windows&cd=3&hl=en&ct=clnk&gl=in>>, Apr. 29, 2009, pp. 1-29.

Deligiannakis, et al., "Compressing Historical Information in Sensor Networks", Retrieved at <<http://portal.acm.org/ft_gateway.cfm?id=1007628&type=pdf&coll=GUIDE&dl=GUIDE&CFID=32507449&CFTOKEN=66873181>>, Proceedings of the 2004 ACM SIGMOD international conference on Management of data, Jun. 13-18, 2004, pp. 1-12.

Faloutsos, et al., "Fast Subsequence Matching in Time-Series Databases", Retrieved at <<http://citeseerx.ist.psu.edu/viewdoc/download?doi=10.1.1.45.9023&rep=rep1&type=pdf>>, In SIGMOD '94: Proceedings of the 1994 ACM SIGMOD international conference on Management of data, 1994, pp. 1-11.

Garofalakis, et al., "Deterministic Wavelet Thresholding for Maximum-Error Metrics", Retrieved at <<http://portal.acm.org/ft_gateway.cfm?id=1055582&type=pdf&coll=GUIDE&dl=GUIDE&CFID=32507761&CFTOKEN=81858955>>, Proceedings of the twenty-third ACM SIGMOD-SIGACT-SIGART symposium on Principles of database systems, Jun. 14-16, 2004, pp. 166-176.

Guestrin, et al., "Distributed Regression: An Efficient Framework for Modeling Sensor Network Data", <<Retrieved at <<http://www.cs.berkeley.edu/~bodikp/publications/ipsn04.pdf>>, Proceedings of the 3rd international symposium on Information processing in sensor networks, Apr. 26-27, 2004, pp. 1-10.

Johnson, David S., "Approximation Algorithms for Combinatorial Problems", Retrieved at <<http://portal.acm.org/ft_gateway.cfm?id=804034&type=pdf&coll=GUIDE&dl=GUIDE&CFID=32508344&CFTOKEN=10113723>>, Proceedings of the fifth annual ACM symposium on Theory of computing, Apr. 30-May 2, 1973, pp. 38-49.

Keogh, et al., "Locally Adaptive Dimensionality Reduction for Indexing Large Time Series Databases", Retrieved at <<http://www.ceid.upatras.gr/faculty/vasilis/Courses/SpatialTemporalDM/Papers/sigmod2001Keogp-et-al.pdf>>, In proceedings of ACM SIGMOD Conference on Management of Data, May 2001, pp. 1-12.

Keogh, et al., "A Simple Dimensionality Reduction Technique for Fast Similarity Search in Large Time Series Databases", Retrieved at <<http://www.cs.ucr.edu/~eamonn/pakdd200_keogh.pdf>>, Proceedings of the 4th Pacific-Asia Conference on Knowledge Discovery and Data Mining, Current Issues and New Applications, Apr. 18-20, 2000 pp. 1-12.

Kimura, et al., "A Survey on Data Compression in Wireless Sensor Networks", Retrieved at <<http://ieeexplore.ieee.org/stamp/stamp.jsp?tp=&arnumber=1425113&isnumber=30769>>, Proceedings of the International Conference on Information Technology: Coding and Computing, vol. 2, Apr. 4-6, 2005, pp. 1-6.

Korn, et al., "Efficiently Supporting Ad Hoc Queries in Large Datasets of Time Sequences", Retrieved at <<http://citeseerx.ist.psu.edu/viewdoc/download?doi=10.1.1.45.9628&rep=rep1&type=pdf>>, Proceedings of the 1997 ACM SIGMOD international conference on Management of data, May 11-15, 1997, pp. 1-25.

Kuehn, et al., "A Heuristic Program for Locating Warehouses", Retrieved at <<http://mansci.journal.informs.org/cgi/content/abstract/9/4/643>>, Management. Science, vol. 9, No. 4, Jul. 1963, pp. 1-2.

Li, et al., "Mining Approximate Top-K Subspace Anomalies in Multi-Dimensional Time-Series Data", Retrieved at <<http://portal.acm.org/ft_gateway.cfm?id=1325904&type=pdf&coll=GUIDE&dl=GUIDE&CFID=32509491&CFTOKEN=97298299>>, Proceedings of the 33rd international conference on Very large data bases, Sep. 23-28, 2007, pp. 447-458.

Lin, et al., "A Symbolic Representation of Time Series, With Implications for Streaming Algorithms", Retrieved at <<http://www.cs.ucr.edu/~eamonn/SAX.pdf>>, DMKD03: 8th ACM SIGMOD Workshop on Research Issues in Data Mining and Knowledge Discovery, 2003, pp. 2-11.

Lin, et al., "Iterative Incremental Clustering of Time Series", Retrieved at <<http://www.cs.ucr.edu/~jessica/Lin_wavelet_EDBT.pdf>>, Advances in Database Technology—EDBT 2004, Feb. 19, 2004, pp. 1-18.

Liu, et al., "Towards Discovering Data Center Genome using Sensor Nets", Retrieved at <<http://research.microsoft.com/pubs/78616/emnets08dcgenome.pdf>>, HotEmNets 08, Jun. 2-3, 2008, pp. 1-5.

Jermaine, et al., "Online Maintenance of Very Large Random Samples", Retrieved at <<http://www.cise.ufl.edu/~cjermain/JermaineCR.pdf>>, Proceedings of the 2004 ACM SIGMOD international conference on Management of data, Jun. 13-18, 2004, pp. 1-12.

Pugh, William, "Skip Lists: A Probabilistic Alternative to Balanced Trees", Retrieved at <<http://portal.acm.org/ft_gateway.cfm?id=78977&type=pdf&coll=GUIDE&dl=GUIDE&CFID=32510615&CFTOKEN=63427198>>, Communications of the ACM, vol. 33, No. 6, Jun. 1990, pp. 668-676.

Rafiei, et al., "Similarity-Based Queries for Time Series Data", Retrieved at <<http://portal.acm.org/ft_gateway.cfm?id=253264&type=pdf&coll=GUIDE&dl=GUIDE&CFID=33409107&CFTOKEN=58552438>>, Proceedings of the 1997 ACM SIGMOD international conference on Management of data, May 11-15, 1997, pp. 13-25.

Rafiei, et al., "Querying Time Series Data Based on Similarity", Retrieved at <<http://citeseerx.ist.psu.edu/viewdoc/download?doi=10.1.1.106.7988&rep=rep1&type=pdf>>, IEEE Transactions on Knowledge and Data Engineering, vol. 12, No. 5, Sep. 2000, pp. 675-693.

Ramaswamy, et al., "Shared Description Fusion Coding for Storage and Selective Retrieval of Correlated Sources", Retrieved at <<http://ieeexplore.ieee.org/stamp/stamp.jsp?arnumber=04483304>>, Data Compression Conference, Mar. 25-27, 2008, pp. 262-271.

Slepian, et al., "Noiseless Coding of Correlated Information Sources", Retrieved at <<http://ieeexplore.ieee.org/stamp/stamp.jsp?tp=&isnumber=&arnumber=1055037>>, IEEE Transactions on Information Theory, vol. 19, No. 4, Jul. 1973, pp. 471-480.

Xiong, et al., "Distributed Source Coding for Sensor Networks", Retrieved at <<http://ieeexplore.ieee.org/stamp/stamp.jsp?tp=&isnumber=&arnumber=1328091>>, IEEE Signal Processing Magazine, vol. 21, No. 5, Sep. 2004, pp. 80-94.

* cited by examiner

QUERYING COMPRESSED TIME-SERIES SIGNALS

BACKGROUND

Increased instrumentation of physical systems and computing processes has caused a substantial amount of data to be generated, collected, and analyzed. For example, applications for data center monitoring, environmental monitoring, scientific experiments, mobile asset tracking, amongst other applications produce massive time-series signals from multiple sensors. Some existing data analysis systems can execute certain queries in real-time over received time-series signals. Conventional data analysis systems, however, are unable to efficiently archive and analyze time-series signals over long periods of time.

Particularly, archiving and query processing can be challenging for conventional data analysis systems due to the sheer volume of data that can be generated by sensors associated therewith. For example, a data center for an online service provider can include tens of thousands of servers, and one hundred performance counters can be collected from each server to monitor server utilization. Additionally, for each server, ten physical sensors can be used to monitor power consumption and operation environment (e.g., internal and external temperatures pertaining to a server). Thus, a data center with fifty thousand servers can be associated with 55 million concurrent data streams and, with a 30-second sampling rate, can have fifteen billion records (about one terabyte) of data generated per day. While most recent data are used in connection with real-time monitoring and control pertaining to the data center, historical data can be used in connection with capacity planning, workload placement, pattern discovery, and fault diagnostics. Many of these tasks require utilization of time-series signals over several months. Due to sheer volume of the data, archiving such data in a raw form over several months can consume prohibitively large amounts of storage space, while executing queries over such data may be impractically slow.

Conventional data analysis/database applications address space-efficient archival and query processing separately. For example, many database systems compress data for space-efficiency; however, prior to queries being executed, the data must be decompressed. For large amounts of data, such an approach may be infeasible since decompression overhead would cause query latency to become too great for practical use.

SUMMARY

The following is a brief summary of subject matter that is described in greater detail herein. This summary is not intended to be limiting as to the scope of the claims.

Described herein are various technologies pertaining to compressing time-series signals and executing queries pertaining to time-series signals. As will be described in greater detail herein, queries can be executed over compressed signals that are representative of one or more raw time-series signals. Pursuant to an example, a raw time-series signal can be received, and a plurality of time-series signals that are based at least in part upon the raw time-series signal can be generated. For instance, a first time-series signal can be generated by passing the raw time-series signal through a low pass filter to generate a filtered signal and down sampling the resultant filtered signal. Thus, the first time-series signal can be a compressed representation of low-frequency portions of the raw time-series signal.

A second time-series signal can be representative of spikes (e.g., anomalous spikes) in the raw time-series signal. These spikes can represent sudden changes in raw signals, and can be useful in connection with detecting faults or anomalies that may occur in a monitored system. The second time-series signal, in an example, can be ascertained by determining a difference between the raw time-series signal and the aforementioned filtered signal, and thereafter removing samples below a threshold value. Removing the samples below the threshold value causes noise to be removed, and results in a time-series signal that represents spikes in the raw time-series signal.

A third time-series signal can be representative of high frequency portions of the raw time-series signal. For instance, to obtain the third time-series signal, a residual from the difference between the raw time-series signal and the sum of the filtered signal and spikes can be obtained and compressed. Pursuant to an example, random projection can be used in connection with compressing the residual.

The first, second, and third time-series signals may then be employed in connection with execution of queries. For example, a query can be received and can be selectively executed over one or more of the first time-series signal, the second time-series signal, or the third time-series signal. It is to be noted that queries can be executed over the first, second, and third time-series signals without performing any decompression. Queries that can be executed over the first, second, and/or third time-series signals include queries for determining trends in the raw time-series signal, queries for determining histograms pertaining to the raw time-series signal, queries for determining correlations pertaining to the raw time-series signal, amongst other queries.

Other aspects will be appreciated upon reading and understanding the attached figures and description.

DETAILED DESCRIPTION

Figure 1:
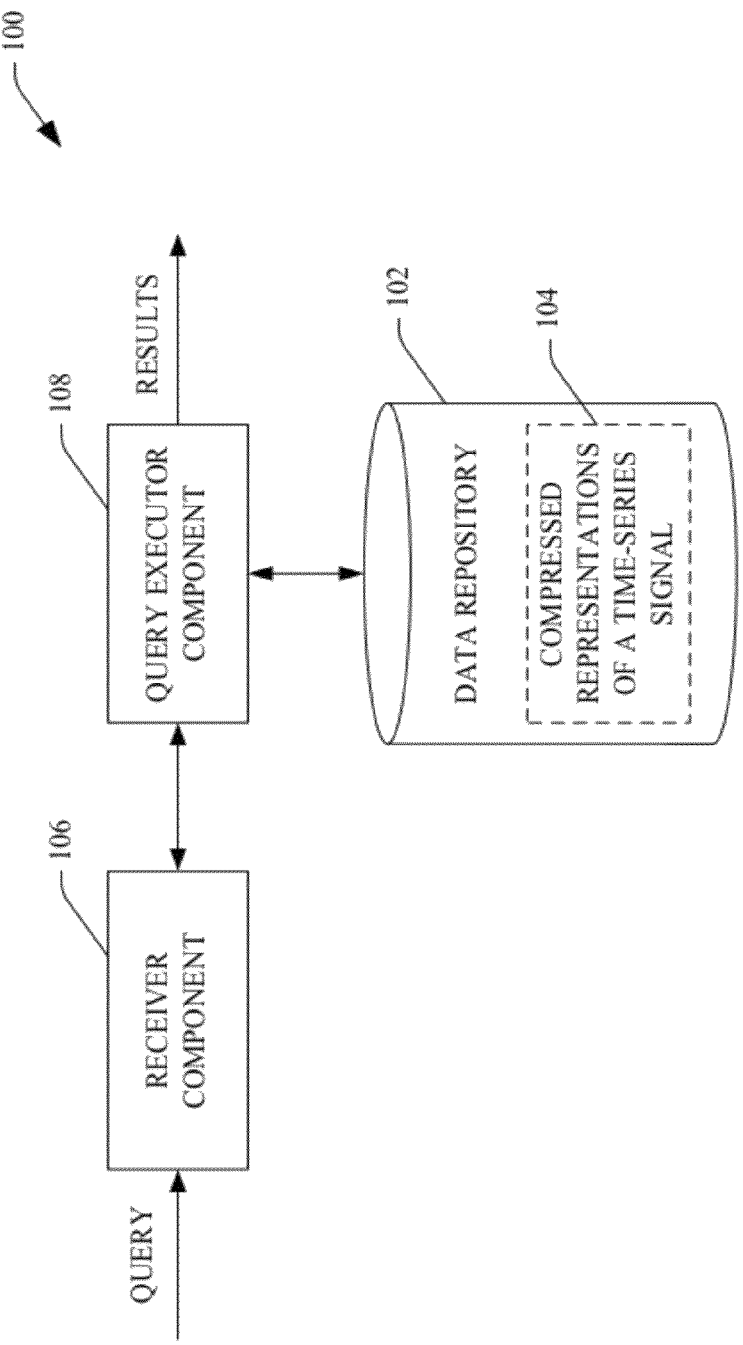
FIG. 1 is a functional block diagram of an example system that facilitates executing a query over at least one time-series signal.

Various technologies pertaining to executing queries over time-series signals and compressing time-series signals will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates executing a query over at least one compressed representation of a raw time-series signal is illustrated. Pursuant to an example, the system 100 may be used in connection with managing data captured from servers in a data center. For instance, the raw time-series data may pertain to processor usage of a computing device in a data center. It is to be understood, however, that the system 100 may be used in connection with any system/application that is associated with generation of relatively large amounts of time-series data.

The system 100 includes a data repository 102 that comprises a plurality of compressed representations 104 of portions of a raw time-series signal. In an example, the plurality of compressed representations 104 can include a first time-series signal that comprises low frequency portions of the raw time-series signal, a second time-series signal that comprises spikes or anomalies resident in the raw time-series signal, and a third time-series signal that represents a high frequency portions of the raw time-series signal (e.g., the third time-series signal can represent a compression of the high frequency portions of the raw time-series signal). Generation of the first, second, and third time-series signals are described in greater detail herein. Of course, the data repository 102 may include compressed representations for a plurality of time-series signals.

The system 100 also includes a receiver component 106 that receives a query that pertains to the raw time-series signal. As will be described in greater detail below, the query can be a query for determining a trend pertaining to the raw time-series signal, a query for determining a histogram pertaining to the raw time-series signal, or a query for determining a correlation pertaining to the raw time-series signal.

A query executor component 108 is in communication with receiver component 106, and can selectively execute the query received by the receiver component 106 over at least one of the compressed representations of the raw-time series signal retained in the data repository 102. In an example, if the query is for determining a trend pertaining to the raw time-series signal, the executor component 108 can execute the query over the first time-series signal. In another example, if the query is for generating a histogram pertaining to the raw time-series signal, the executor component 108 can execute the query over the first and the second time-series signals. In yet another example, if the query is for determining a correlation pertaining to the raw time-series signal within a relatively short time window, the executor component 108 can execute the query over the third time-series signal. Still further, if it is desirable to execute the query over a single representation of the raw time-series signal, a representation of such signal can be ascertained through summation of the first time-series signal and the second time-series signal (which can represent the raw time-series signal without the noise, or high frequency, portion). The particular time-series signal used when executing the query can be automatically selected based upon terms in the query or structure of the query. In another example, the particular time-series signal used when executing the query can be manually selected by a user who issues the query.

For purposes of explanation, an example set of queries that can be executed in connection with the first, second, and/or third time-series signals is described. The example is provided with respect to using performance counters from a production Internet service with numerous users; it is to be understood, however, that similar queries can be proffered for data pertaining to other applications.

In this example, the production Internet service has millions of users and three types of servers: type A, type B, and type C. Fifty servers can be instrumented for each type, for a total of one hundred and fifty servers. Each of the servers can be stateful, but in different ways. Type A servers can be client facing, behind load balancers, and maintain long living TCP connections with clients. Type B and C servers can be internal servers that are behind type A servers.

In this example, CPU utilization of the servers is instrumented. The CPU utilization on each server can be affected by numerous factors, including but not limited to a total number of users in the system, one or more load balancing algorithms that determines the number of users to assign to each server, background tasks, software bugs, etc. Processor utilizations of the servers can be collected every thirty seconds, such that each server generates 2880 CPU samples per day. As described previously, these raw time-series signals received from the servers can be archived as a plurality of time-series signals that are compressed representations of a portion of the received raw time-series signals: the first time-series signal, the second time-series signal, and the third time-series signal.

As noted above, different types of queries can be executed over the different time-series signals that represent a raw time-series signal. Example queries are provided herein:

Query 1 (capacity planning): What is the average growth rate for the service over the last three months?

Query 2 (server provisioning): How many servers have reached 80-percentile utilization in the last Christmas season?

Query 3 (dependency analysis): Are behaviors of type A servers correlated with that of type B servers?

Query 4 (load balancing): Do servers within a cluster receive a balanced load?

Query 5 (anomaly detection): Are utilization spike patterns on servers in one cluster also exhibited by other servers?

Query 1 is a trend query. In this example, the number of users in the system may be known to scale linearly with total CPU utilization. Accordingly, average user growth can be approximated by computing daily average of CPU utilizations across all servers. This can be accomplished, for instance, by executing the query over the first time-series signal(s) pertaining to a server or servers.

Query 2 is a histogram query over a time window and across all servers. In this example, the query can be executed over first time-series signals for all raw time-series signals pertaining to the servers. Histograms are approximations of a probability distribution for the values the raw time-series signal takes if viewed as a random variable. Histogram queries are relatively common queries with respect to archived data. As will be shown below, the first time-series signal can be a downsampled approximation of a low frequency portion of the raw time-series signal. When executing queries, the first time-series signal can be upsampled to comply with a desired error tolerance.

Queries 3, 4, and 5 are correlation queries that can be used to ascertain similarity in the data directly or features included in the data. Such queries, however, can be executed over different representations of portions of one or more raw time-series signals. For instance, Query 3 can be executed over the first time-series signal (e.g., by computing correlation between first time-series signals with a suitable algorithm). Query 4 can be answered using the third time-series signal (e.g., the high frequency components of raw time-series signals). Additionally, Query 5 can be executed over the second time-series signal, as the other time-series signals fail to capture spikes existent in the raw time-series signals.

Figure 2:
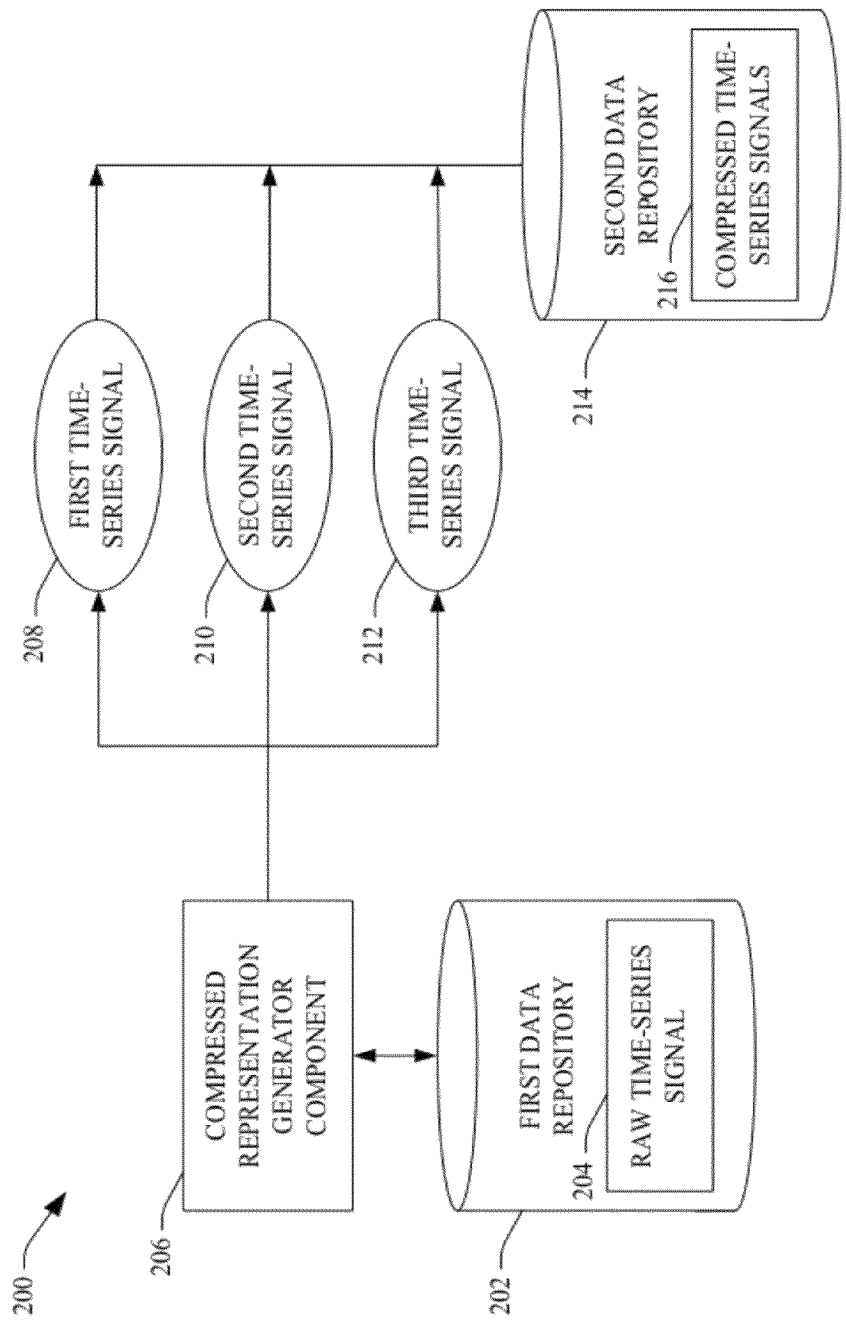
FIG. 2 is a functional block diagram of an example system that facilitates generating a plurality of time-series signals that are based at least in part upon a raw time-series signal.

Turning now to FIG. 2, an example system 200 that facilitates generating time-series signals that are compressed representations of portions of a raw time-series signal is illustrated. The system 200 includes a first data repository 202 that comprises a raw time-series signal 204. In an example, the first data repository 202 can be a memory buffer that is configured to temporarily retain the raw time-series signal 204. For instance, the raw time-series signal 204 can be archived for a threshold period of time, and thereafter be subject to compression to efficiently utilize storage space. While shown as being retained in the data repository 202, it is to be understood that the time-series signal 204 may be received in real-time from a sensor or arrangement of sensors.

A compressed representation generator component 206 can access the data repository 202 and retrieve the raw time-series signal 204. In another example, the compressed representation generator component 206 can receive the time-series signal 204 from a sensor or arrangement of sensors. The compressed representation generator component 206 can generate a first time-series signal 208, a second time-series signal 210, and a third time-series signal 212 that are representations of portions of the raw time-series signal 204. As noted above, the first time-series signal can represent low frequency portions of the raw time-series signal 204, the second time-series signal 210 can represent spikes (anomalies) in the raw time-series signal 204, and the third time-series signal 212 can represent a high-frequency (noise) portion of the raw time-series signal 204.

The system 200 may additionally include a second data repository 214, and the compressed representation generator component 206 can cause the first time-series signal 208, the second time-series signal 210, and the third time-series signal 212 to be stored as compressed time-series signals 216 in the data repository 214 (or distributed across multiple data repositories). Furthermore, once the first time-series signal 208, the second time-series signal 210, and the third time-series signal 212 have been generated, the raw time-series signal 204 can be removed from the first data repository 202 to free up storage space.

Figure 3:
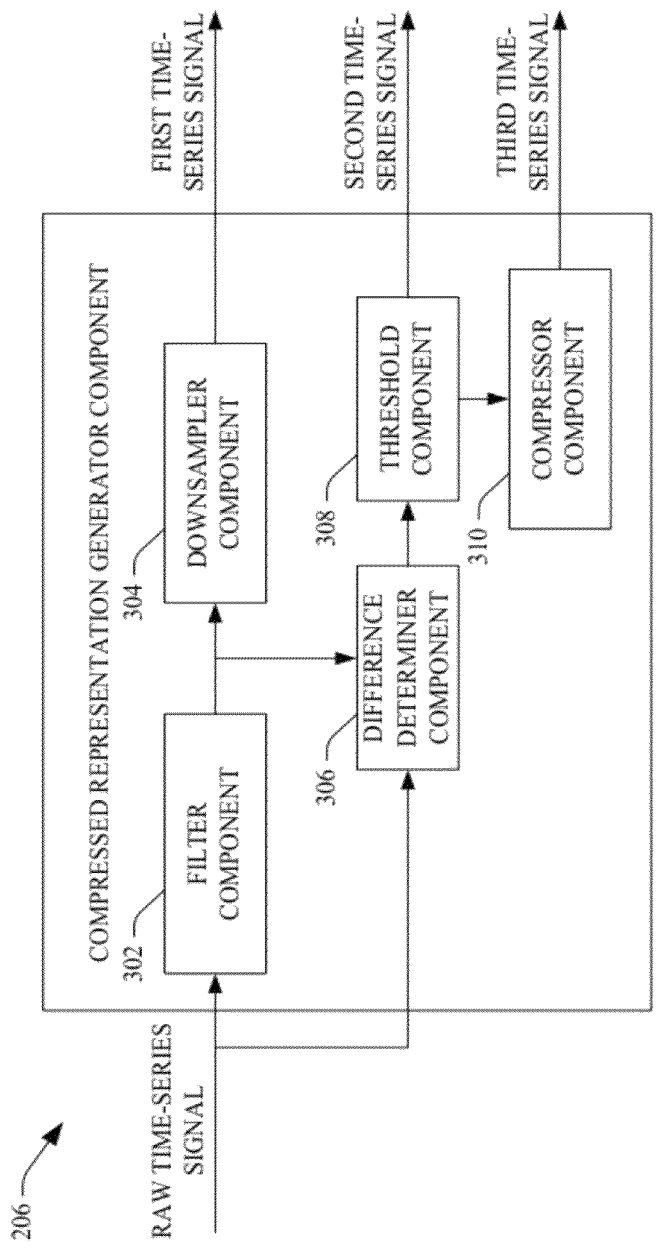
FIG. 3 is a functional block diagram of an example component that facilitates generating a plurality of time-series signals that are based at least in part upon a raw time-series signal.
Figure 4:
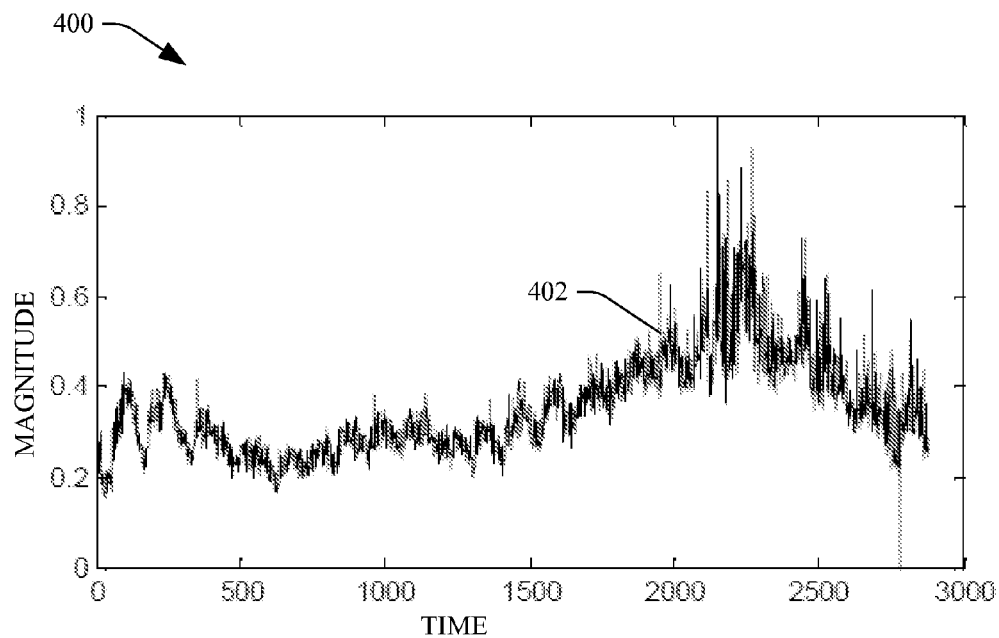
FIG. 4 depicts a graph that represents a raw time-series signal.

Now referring to FIG. 3, an exemplary detailed depiction of the compressed representation generator component 206 (FIG. 2) is illustrated. The compressed representation generator component 206 comprises a filter component 302 that receives the raw time-series signal. Turning briefly to FIG. 4, a graph 400 that represents an example raw time-series signal 402 is depicted.

Figure 5:
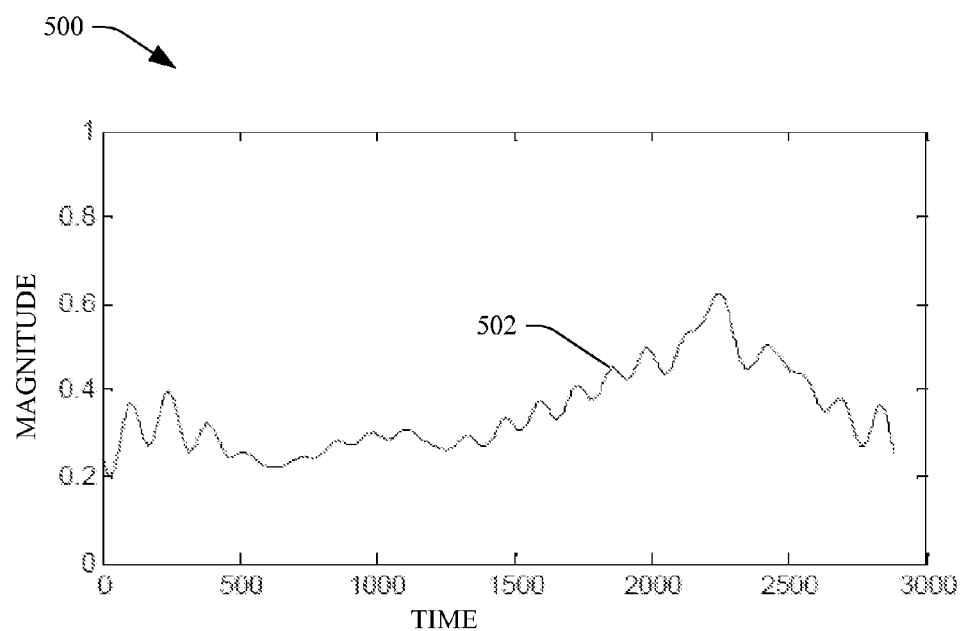
FIG. 5 depicts a graph that represents a signal that is a filtered version of a raw time-series signal.

Returning to FIG. 3, the filter component 302 can be a low-pass filter that receives the time-series signal and outputs a filtered signal. The filtered signal, in an example, may have a cut-off frequency of $\pi f_s/M$, where M is an application-specific parameter that can be tunable based upon a nature of the raw time-series signal. For instance, the filter component 302 can be configured to execute a Fast Fourier Transform, and a first threshold number of coefficients of the Fast Fourier Transform can be retained. In another example, the filter component 302 can cause averages of values over certain periods of time to be generated and output. In yet another example, the filter component 302 can be configured to randomly select a sample within time windows of a threshold size (undersample the raw time-series data). It is thus to be understood that the filter component 302 can utilize any suitable filtering technique in connection with outputting the filtered signal, which is a representation of low frequency portions of the raw time-series signal. With reference to FIG. 5, an example graph 500 depicting a filtered signal 502 of the raw time-series signal 402 (FIG. 4) is illustrated. As can be ascertained, high-frequency portions (e.g., noise) of the raw time-series signal 402 and spikes (anomalies) in the raw time-series signal 402 have been filtered from the raw time-series signal 402.

Figure 6:
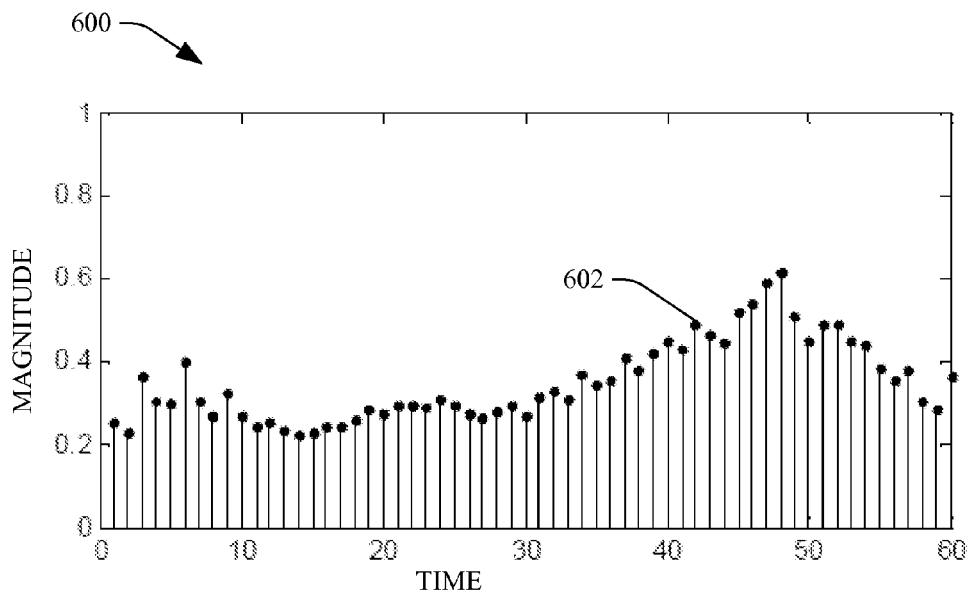
FIG. 6 depicts a graph that represents a downsampled time-series signal.

Returning again to FIG. 3, the compressed representation generator component 206 includes a downsampler component 304 that can downsample the filtered signal output by the filter component 302. The signal output by the downsampler component 304 can be the first time-series signal 208 (FIG. 2). Referring briefly to FIG. 6, a graph 600 depicting a time-series signal 602 (an instance of the first time-series signal 208), which is based upon the filtered signal 502 (FIG. 5), is illustrated.

Figure 7:
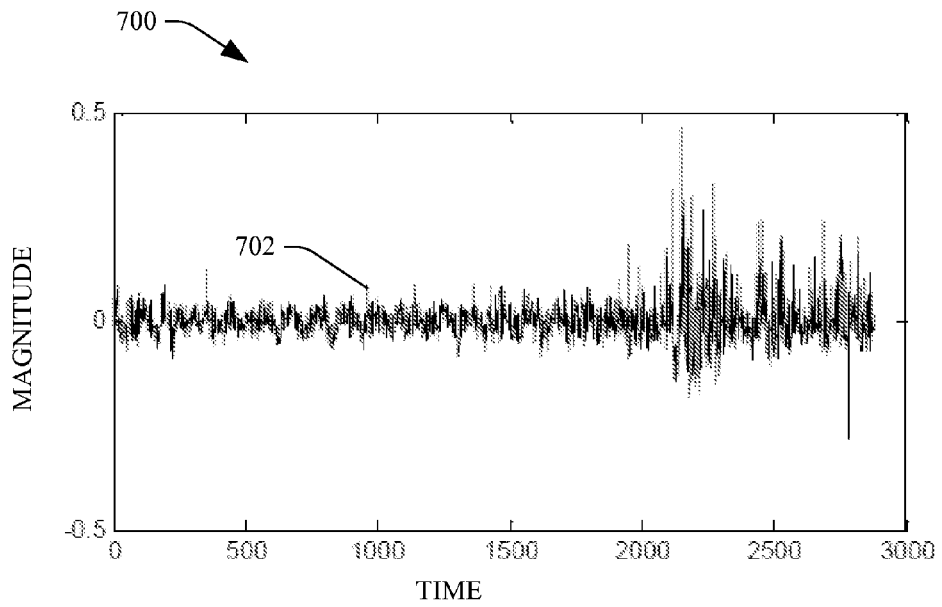
FIG. 7 depicts a graph that represents a difference between a raw time-series signal and a filtered version of the raw time-series signal.

With reference once again to FIG. 3, the compressed representation generator component 206 can include a difference determiner component 306 that can determine a difference between the filtered signal output by the filter component 302 and the raw time-series signal to generate a remainder signal. The remainder signal can include a high frequency portion of the raw time-series signal and spikes or anomalies in the raw time-series signal. More particularly, the remainder signal can be a zero mean "noise" like signal, which may not be helpful in connection with trend analysis. Any significant variation from the standard deviation, however, may be used in connection with fault or anomaly detection. With respect to FIG. 7, an example graph 700 that depicts an example remainder signal 702 output by the difference determiner component 306 is illustrated. The remainder signal 702 is shown as being a difference between the raw time-series signal 402 (FIG. 4) and the filtered signal 502 (FIG. 5).

Figure 8:
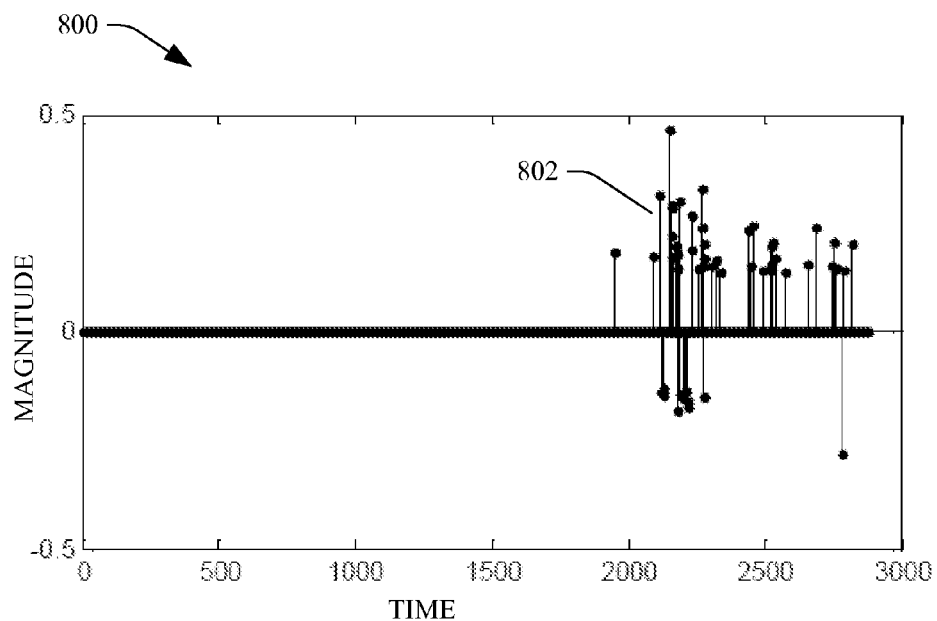
FIG. 8 depicts a graph that represents spikes existent in a raw time-series signal.

Again referring to FIG. 3, the compressed representation generator component 206 can include a threshold component 308 that enforces a threshold in the remainder signal to extract spikes or anomalies from the remainder signal, thereby generating the second time-series signal 210 (FIG. 2). For instance, the threshold component 308 can apply a threshold to the "noise", wherein the threshold can be application specific. Spikes or anomalies are typically sparse due to Gaussian-like distribution of noise. With reference to FIG. 8, an example graph 800 that depicts spikes 802 extracted from the raw-time series signal 402 (FIG. 4) (e.g., the second time-series signal 210) is illustrated.

Figure 9:
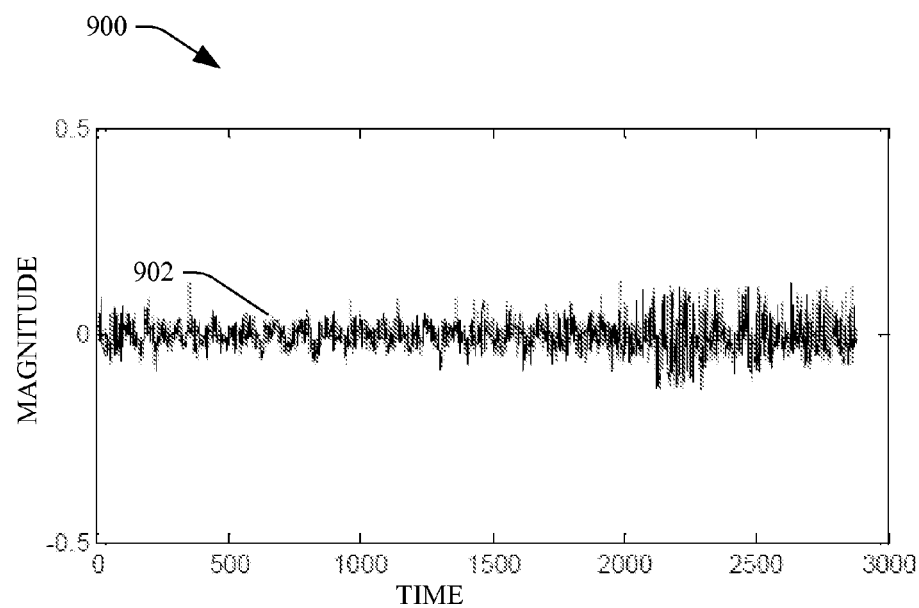
FIG. 9 depicts represents a high frequency portion of a raw time-series signal.
Figure 10:
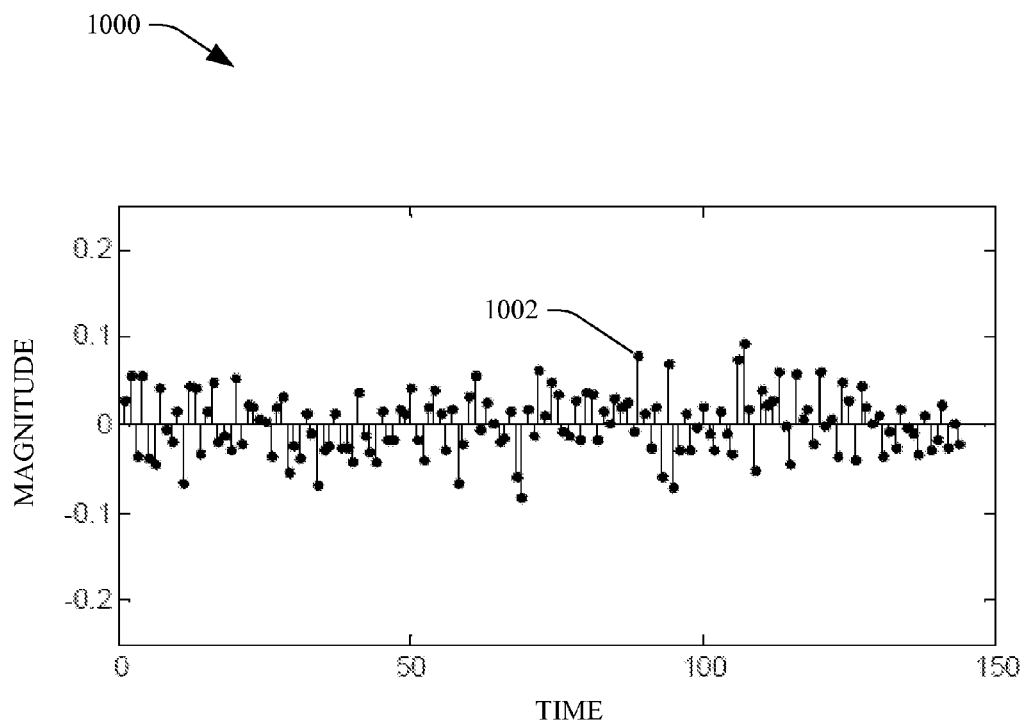
FIG. 10 depicts a compressed version of a high frequency portion of a raw time-series signal.

The threshold component 308 can also output a residual time-series signal (the "noise" signal with the spikes removed therefrom). With respect to FIG. 9, an example graph 900 that depicts a residual signal 902 output from the threshold component 308 is illustrated. Returning again to FIG. 3, the compressed representation generator component 206 may also include a compressor component 310 that compresses the residual signal output by the threshold component 308 to generate the third time-series signal 212 (FIG. 2). The compressor component 310 may use any suitable compression technique in connection with compressing the residual signal. The compressor component 310 can compress the residual through utilization of a random projection technique. Turning to FIG. 10, an example graph 1000 that depicts a signal 1002 output by the compressor component 310 (e.g., the third time-series signal 212) is illustrated.

With respect to random projection, a compressive random projection of linear transformation can be $A \in \mathbb{R}^{m \times n}$ with $m < n$, where the element of the matrix A is drawn from a random variable, such as a Gaussian variable. For a signal with dimension (e.g., length) n, the projected signal can be of dimension m. In an example, n successive data points in the residual signal can be grouped into a vector of length n, and the third time-series signal 212 can be computed for the entire vector. Further, values for elements of the matrix can be selected so as to avoid false negatives when correlation queries are executed using the third time-series signal 212. For instance, a correlation query can be used to determine a measure of similarity between two time-series signals. The third time-series signal 212 may be used in connection with certain types of correlation queries. As the third time-series signal 212 is a compression of the residual signal, false negatives (e.g., indicating that two signals are dissimilar when they are, in fact, similar) and false positives (e.g., indicating that two signals are similar when they are, in fact, dissimilar) can occur. Occurrences of false negatives can be eliminated or kept below a declared error tolerance through configuration of values of elements in the matrix A. In an example, A can be selected such that the matrix has orthonormal rows (e.g., the largest value in the matrix A is less than one). In another example, variance of each element in the matrix A can be 1/n.

Figure 11:
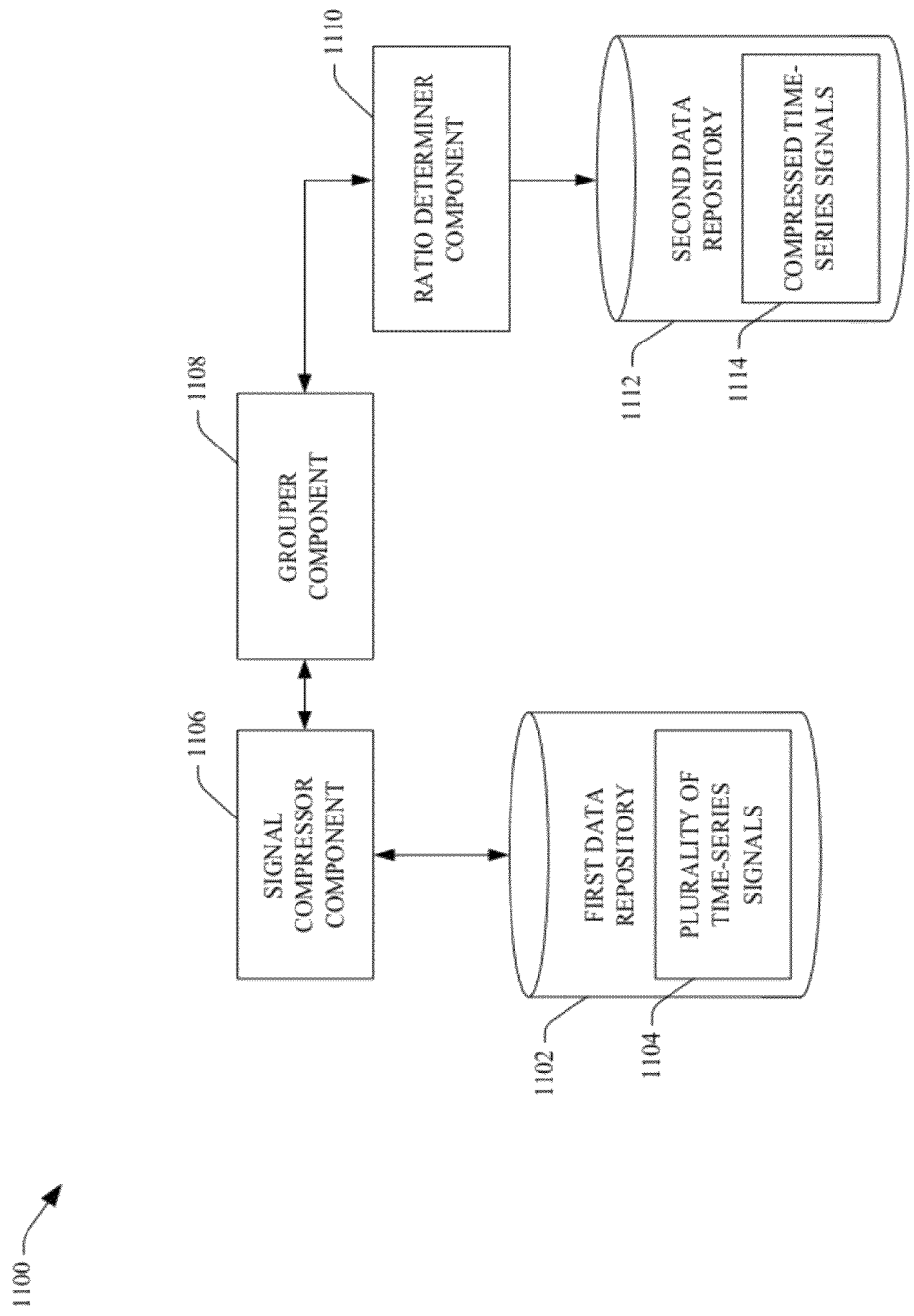
FIG. 11 is a functional block diagram of an example system that facilitates compressing a group of time-series signals.

Now referring to FIG. 11, an example system 1100 that facilitates compressing time-series signals into groups of compressed time-series signals is illustrated. For example, time-series signals subject to compression may be raw time-series signals and/or may be time-series signals that are representative of certain portions of raw time-series signals, such as the first, second, and third time-series signals described above.

The system 1100 optionally comprises a first data repository 1102 that includes a plurality of time-series data signals 1104. The time-series signals 1104 can be raw time-series signals, time-series signals corresponding to the first, second, and third time-series signals described above, or other suitable time-series signals. A signal compressor component 1106 can access the first data repository 1102 and can receive the plurality of time-series signals 1104 stored therein. In another example, the signal compressor component 1106 can receive the time-series signals 1104 from a sensor or arrangement of sensors, and need not access the first data repository 1102 to retrieve the time-series signals 1104. In yet another example, the first data repository 1102 may be a memory buffer or other suitable memory device that can be used to temporarily store the time-series signals 1104.

The signal compressor component 1106 can compress each of the time-series signals in the plurality of time-series signals. For instance, the signal compressor component 1106 can use any suitable compression technique in connection with compressing the plurality of time-series signals 1104, including but not limited to use of Fast Fourier Transforms, wavelets, amongst others. In a specific example, the signal compressor component 1106 can employ piecewise linear approximation or constant piecewise linear approximation in connection with compressing each of the plurality of time-series signals 1104. The signal compressor component 1106 may then cause the compressed time-series signals to be stored in a data repository (e.g., the data repository 1102 or other suitable data repositories) or output to another component or stored in another data repository.

Figure 12:
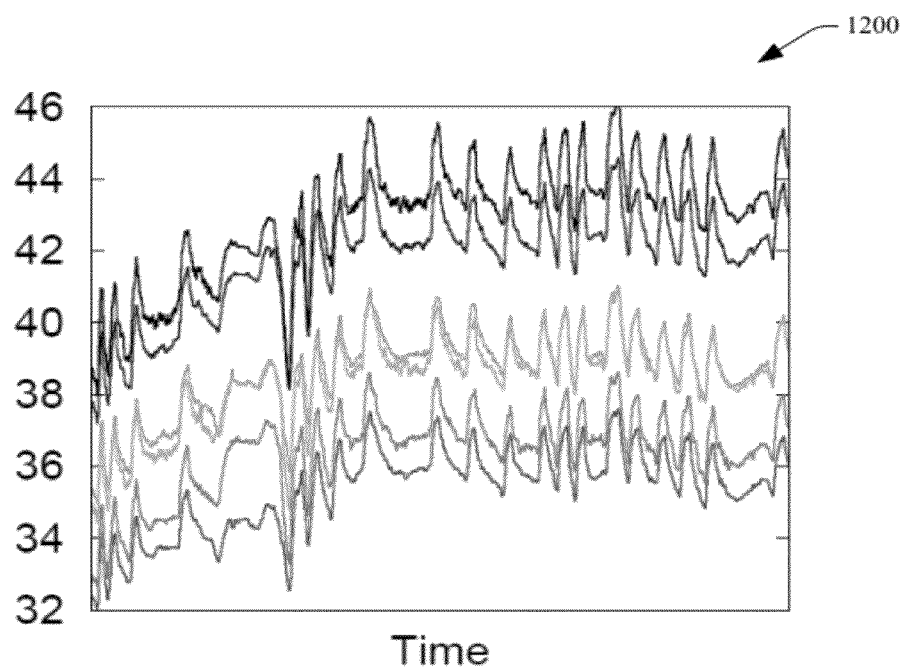
FIG. 12 depicts a graph that illustrates a plurality of similar time-series signals.
Figure 13:
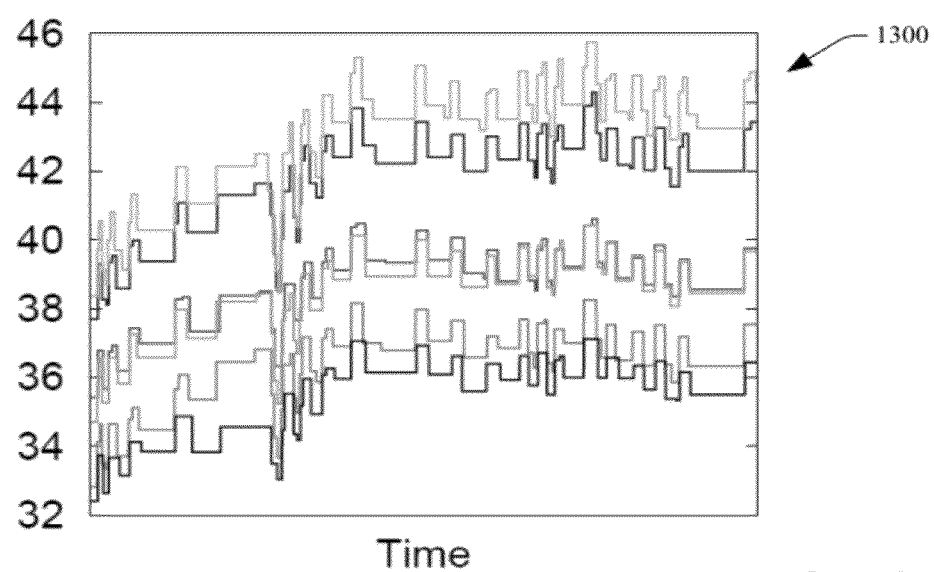
FIG. 13 depicts a graph that illustrates compressed versions of a plurality of time-series signals.

The system 1100 additionally includes a grouper component 1108 that is in communication with the signal compressor component 1106 and/or has direct access to the compressed time-series signals (the time-series signals compressed by the signal compressor component 1106). The grouper component 1108 is configured to analyze the time-series signals compressed by the compressor component 1106 and create groups of time-series signals that are relatively similar. For instance, referring briefly to FIG. 12, an example graph 1200 that includes a plurality of time-series signals that are similar in shape but shifted is illustrated. Referring briefly to FIG. 13, an example graph 1300 that includes the plurality of time-series signals depicted in FIG. 12 after compression by the signal compressor component 1106. While the time-series signals shown in the graphs 1200 and 1300 are shown as already being included in a group, it is to be understood that the grouper component 1108 can analyze multiple time-series signals in connection with placing similar signals in the group. Furthermore, time-series signals may change over time, such that two time-series signals that are similar at a first instance in time may be dissimilar at a second instance in time. Accordingly, the grouper component 1108 can periodically group time-series signals into groups of similar signals.

Figure 14:
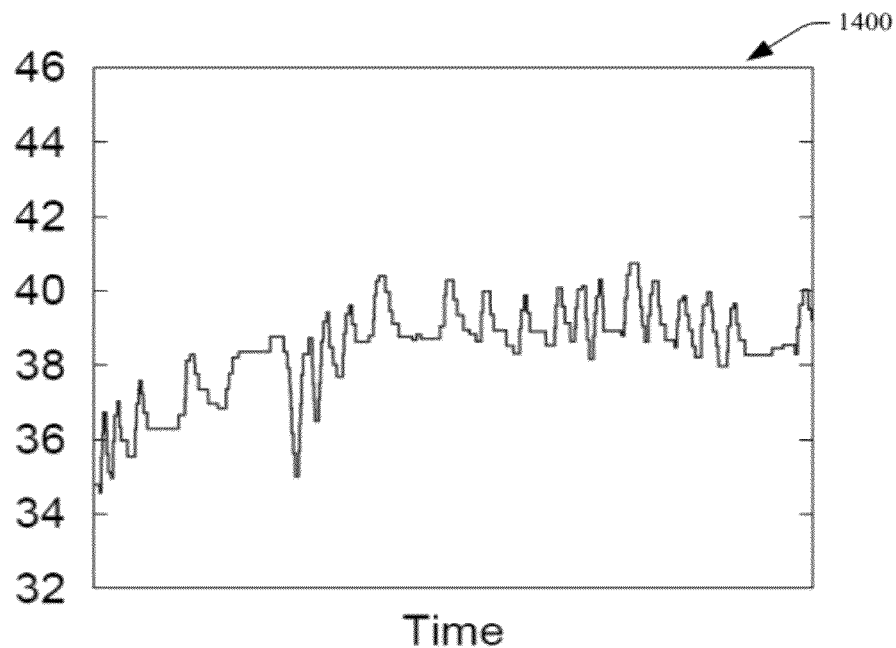
FIG. 14 depicts a graph that illustrates a base time-series signal from amongst a group of time-series signals.

For example, the grouper component 1108 can be configured to group signals together that can be compressed well with amplitude scaling and interval sharing. First, the grouper component 1108 can analyze the time-series signals and select at least one base signal, and thereafter group other time-series signals around such base signal. Referring to FIG. 14, an example graph 1400 that depicts an example base signal for the plurality of signals depicted in the graph 1200 is illustrated. Returning to FIG. 11, the grouper component 1108 may undertake the task of grouping through utilization of a general facility location problem. A general facility location problem is modeled as a graph G(V, E), where a subset of the nodes $F \subset V$ are chosen as facilities (e.g., such as hospitals or fire stations) to service the remaining nodes. Opening a facility at node j incurs a non-negative cost c(j). Servicing a node (client) i using the facility j incurs a cost w(i,j). It can be assumed that a facility serves itself at no cost. The grouper component 1108 can, then, find a set of facilities (base signals) $F \subset V$ that can service all clients (other time-series signals) with a minimum total cost, where it is assumed that each client is serviced by its closest facility. That is, the grouper component 1108 can utilize the following algorithm:

$$\text{Minimize} \sum_{j \in F} c(j) + \sum_{i \in V} w(i, F)$$

where $w(i,F) = \min_{j \in F} w(i,j)$.

When time-series signals are considered, the cost $c(j)$ can represent an amount of storage capacity required for representing an approximation of the base signal. The edge cost $w(i,j)$ can be storage capacity required to represent a signal ratio (described below). It can be ascertained that minimizing cost of the facility location problem minimizes total storage capacity needed to group signals in such a way as to minimize total representation cost for a particular approximation error. Furthermore, the grouper component 1108 can utilize any suitable approximation algorithm in connection with selecting base signals and performing grouping of similar time-series signals.

Furthermore, as noted above, the grouper component 1108 can, from time-to-time, select different base signals and adjust groups. For instance, groups can be computed for different time windows, and window size can be dynamically adjusted to adapt to underlying data. For instance, the window size can be doubled, halved, etc. depending on which window size provides substantially optimal performance in terms of storage capacity utilization.

As noted above, the output of the grouper component 1108 can be a plurality of base signals and other time-series signals that are placed in groups that include one base signal. Thus, a group can include a base signal and a plurality of similar time-series signals. The system 1100 further includes a ratio determiner component 1110 that can generate ratio signals for each time-series signal in a group with respect to the base signal of such group. Thus, for instance, if a group of time-series signals comprises one base signal and ten other time-series signals, the ratio determiner component 1110 can output ten ratio signals. In other words, the ratio determiner component 1110 can divide each of the ten other time-series signals by the base signal to generate the ten ratio signals.

Figure 15:
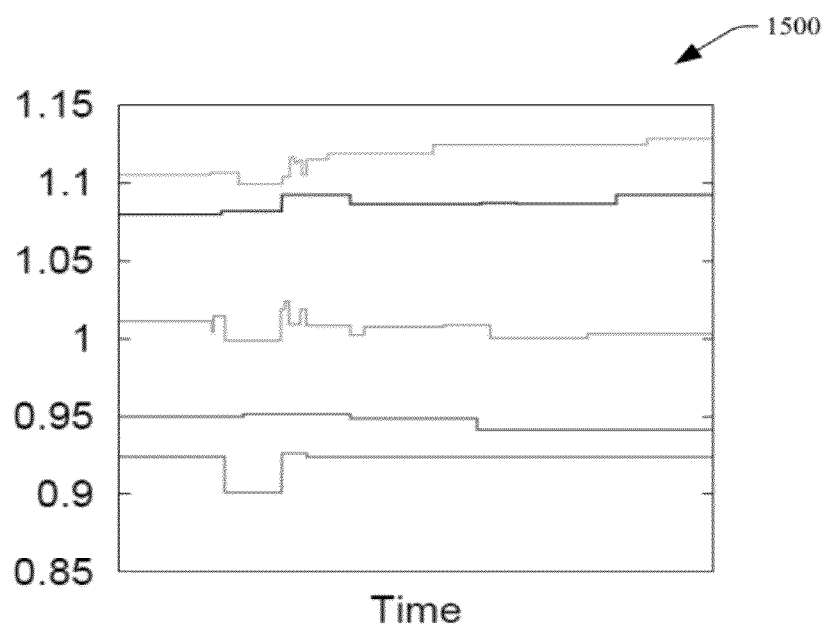
FIG. 15 depicts a graph that illustrates a plurality of ratios between a base time-series signal and time-series signals that are similar to the base time-series signal.

The ratio determiner component 1110 can cause the base signal, the corresponding ratio signals, and an index that can be used to locate a particular signal to be stored in a second data repository 1112 or other data repository as compressed time-series signals 1114. Additionally, the plurality of time-series signals 1104 can be removed from the data repository 1102 (e.g., the memory buffer) to free up storage space. With reference to FIG. 15, an example graph 1500 depicting ratio signals pertaining to the base signal shown in FIG. 14 and compressed signals in a group with the base signal (FIG. 13) is illustrated. As can be ascertained, the ratio signals are relatively flat, and can therefore be compactly stored. While the ratio determiner component 1110 has been described as outputting ratio signals, it is to be understood that the ratio determiner component 1110 can be configured to output delta signals (differences between a base time-series signal and signals in the group with the base time-series signal) or other representations of time-series signals with respect to a base signal.

Figure 16:
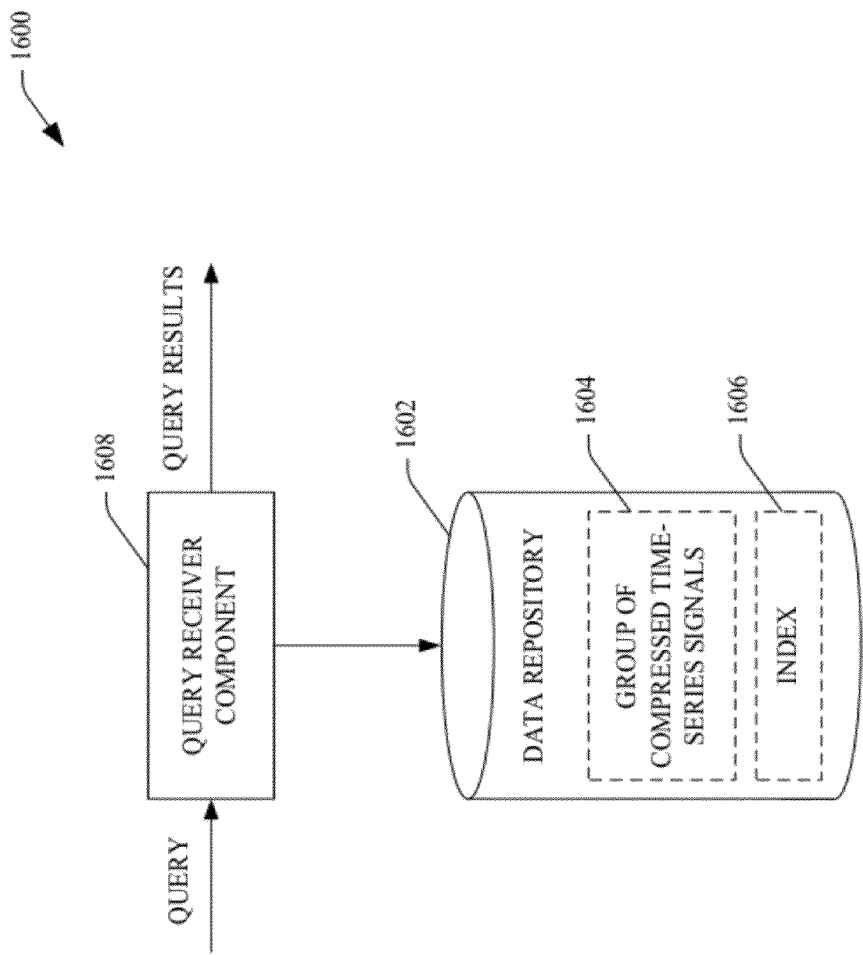
FIG. 16 is a functional block diagram of an example system that facilitates executing a query over a group of compressed time-series signals.

With reference now to FIG. 16, an example system 1600 that facilitates querying over groups of compressed time-series signals (e.g., compressed as describe above with respect to FIG. 15) is illustrated. The system 1600 comprises a data repository 1602 that includes at least one group of compressed signals 1604. As indicated above, the group of compressed signals 1604 comprises a base signal and ratio signals that are representative of ratios between the base time-series signal and the other signals in the group. The group of compressed signals 1604 can be retained in the data repository 1602 in accordance with a particular index structure to facilitate efficient querying of time-series signals in/represented in the group of compressed signals 1604.

For example, the group of compressed signals 1604 can have a multi skip list index 1606 corresponding thereto. The index 1606 can include a signal index that maintains a mapping between an identity of a time-series signal and compressed data corresponding to the time-series signal. The signal index can be an array, a B-Tree, a hash table, or other suitable index structure that can be used to look up a value for a given key (time-series signal identification).

Each entry in the signal index can point to a chain that represents compressed data for a corresponding signal, which can be maintained sequentially. Thus, data can be organized in sorted order corresponding to timestamps associated therewith. For looking up data based upon timestamps, each chain can be organized as a skip list, which is an ordered linked list with additional forward links added in a randomized or pseudo-randomized manner with a geometric/negative binomial distribution. Thus, a search in the list may quickly skip parts of the list. Data that includes skip nodes may include data pertaining to a start time of a segment of data, an indication that the data corresponds to a base time-series signal or an identity of the base time-series signal, and an approximation for a certain time window (whether the approximation is a ratio signal or a base time-series signal). Furthermore, new nodes can be created when a grouping structure changes. Moreover, a second-level skip list can be embedded within each first-level skip list node to facilitate searching within a node in logarithmic time.

The system 1600 additionally includes a query receiver component 1608 that receives a query and executes the query over at least one time-series signal represented in the group of compressed time-series signals 1604. Example queries that can be executed by the query receiver component 1608 include a point query, a range query, and/or a similarity query. A point query refers to a query that requests a value of a signal or signals at a certain instance in time. To answer a point query, a skip-list of the appropriate signal is accessed to locate a node that comprises data pertaining to the certain instance in time. Thereafter, the segment of the node that comprises a timestamp corresponding to the certain instance in time is located. If the node corresponds to a base time-series signal, a value corresponding to the timestamp can be output as a query result. Otherwise, the timestamp of the base time-series signal is located and a value corresponding to such timestamp is multiplied by the value of the segment being queried over for the timestamp. The result of the multiplication may then be output as a query result.

A range query refers to a query that requests values of a time-series signal over a time range. To execute such a query, the query receiver component 1608 can act in a similar manner as described above. For example, the query receiver component 1608 can search for the later instance in time of the time range and following skip list pointers until an earlier instance in time is located. The same process is repeated for the base signal if necessary (e.g., for multiplication with a ratio signal).

A similarity query pertains to analyzing two signals and ascertaining a measure of similarity between the signals over a range of time. The query receiver component 1608 can receive such a query and reconstruct time-series signals pertaining to the query as described above with respect to the range query. The query receiver component 1608 may then utilize any suitable mechanism for determining the similarity measure between signals. An example algorithm that can be employed in connection with determining a measure of similarity between two queries is as follows:

$$sim_{S_i, S_j} = \frac{\sum_{t=t_1}^{t_2} b_{S_i, S_j}(t)}{t_2 - t_1},$$

where $S_i$ represents a first time-series signal, $S_j$ represents a second time-series signal, wherein it is desirable to ascertain whether the first and second time-series signals are similar, $t_1$ represents a beginning of a time range, $t_2$ represents an end of a time range, and $b_{S_i, S_j}(t)$ represents a function that returns a one if the two signals are in a substantially similar group at time t and zero otherwise. Of course, other mechanisms for determining similarity between signals are contemplated and intended to fall under the scope of the hereto-appended claims.

Figure 17:
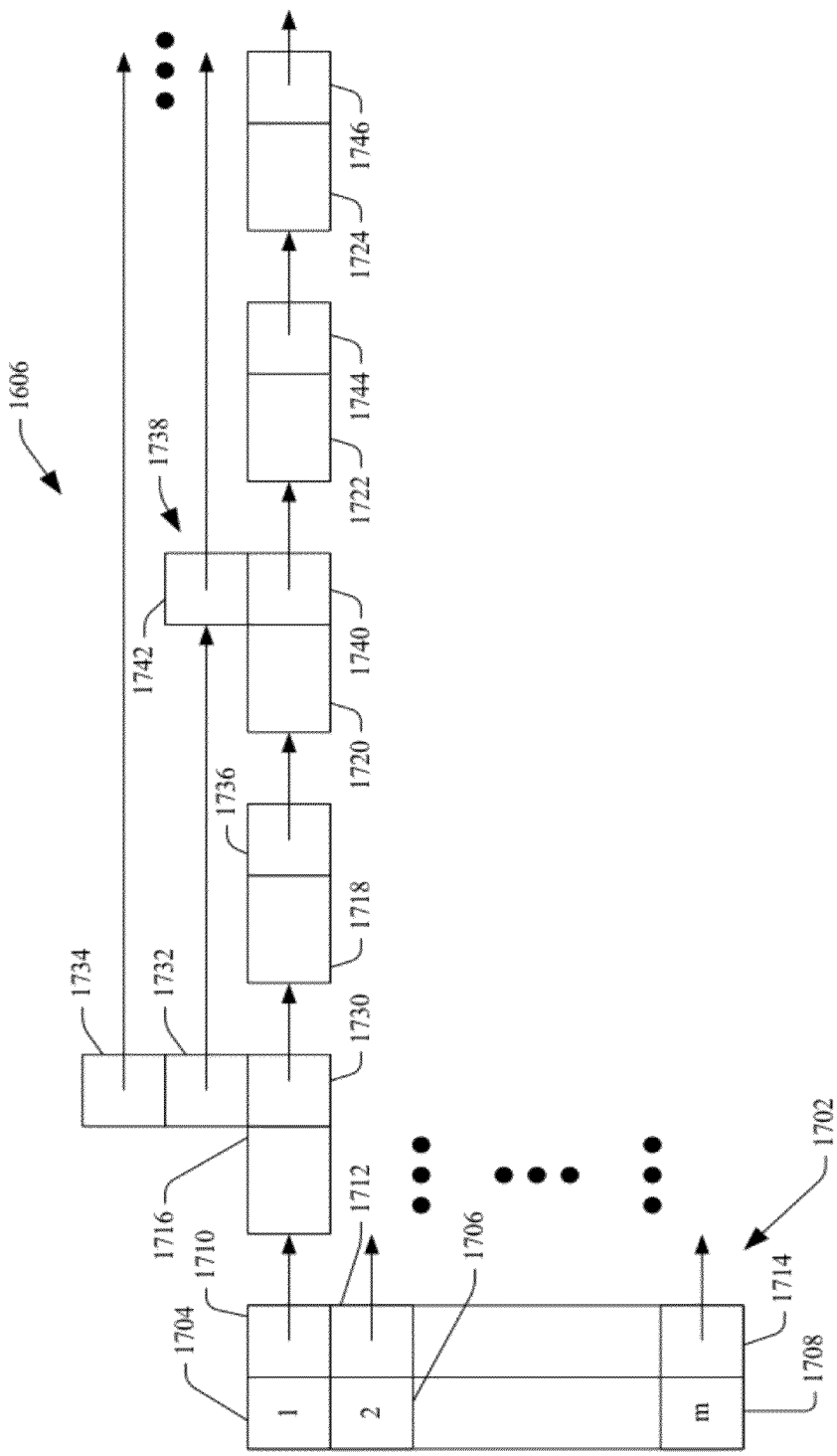
FIG. 17 illustrates an example structure of an index used in connection with executing a query over a compressed signal.

Referring now to FIG. 17, an example structure of the index 1606 is illustrated. The index 1600 includes a signal ID index 1702 that maintains a mapping between an identity of a time-series signal and a compressed version thereof. The signal ID index 1702 is shown as being an array—it is to be understood, however, that the Signal ID index 1702 can be a B-Tree, a hash table, or some other index structure that can efficiently look up data for a given key (e.g., signal ID).

The Signal ID index 1702 comprises multiple entries 1704-1708, wherein each of the entries corresponds to a signal. For instance, the entries 1704-1708 can include a key that is representative of a certain signal. The entries 1704-1708 have pointers 1710-1714, respectively, corresponding thereto. The pointers 1710-1714 point to a chain of compressed data for corresponding signals. Thus, the pointer 1710 for the first entry 1704 points to compressed data corresponding to the signal associated with the first entry 1704.

In an example, the compressed data can have timestamps corresponding thereto, and compressed data can be sequentially appended based at least in part upon the timestamps. For looking up a certain portion of a compressed signal, the chain of compressed data can be organized as a skip list. As indicated above, a skip list is an ordered linked list with additional forward links, which can be added in a randomized or pseudo-randomized manner with a geometric/negative binomial distribution, such that a search in the list may quickly skip parts of the list.

In the example depicted in FIG. 17, the compressed signal corresponding to the first entry 1704 includes multiple list nodes 1716-1724. Each of the list nodes 1716-1724 can include a plurality of fields: a first field that indicates a starting time that corresponds to a portion of the compressed signal, such that a list node with start time t includes compressed data within the time range (t, t'), where t' is the start-time of the next node in the skip list; a second field that includes an indicator pertaining to whether the signal is the base signal of the group and/or an identifier of the base signal of the group; and a third field that includes a compressed representation of the time-series signal between the times t and t'.

Each of the list nodes 1716-1724 (except for a last list node in the chain) can also have a skip list that corresponds thereto (except for a last list node in the chain). Thus, as shown, the first list node 1716 has a first skip list 1726 that corresponds thereto, wherein the first skip list 1726 includes pointers to other list nodes. For instance, the first skip list 1726 an include a first pointer 1730 that points to the list node 1718, a second pointer 1732 that points to the list node 1720, and a third pointer 1734 that points to another list node (not shown). Similarly, the list node 1718 has a skip list 1736 corresponding thereto that includes a pointer that points to the list node 1720, the list node 1720 has a skip list 1738 corresponding thereto that includes a first pointer 1740 that points to the list node 1722 and a second pointer 1742 that points to another list node (not shown), the list node 1722 has a skip list 1744 that includes a pointer that points to the list node 1724, and the list node 1724 has a skip list 1746 that comprises a pointer that points to another list node. These second-level skip lists can allow searching within compressed data in logarithmic time.

When a grouping structure changes for a signal, a new list node can be created (the second field includes information indicating such change) and inserted at the beginning of the skip list, and the signal ID index 1702 is updated accordingly.

Figure 18:
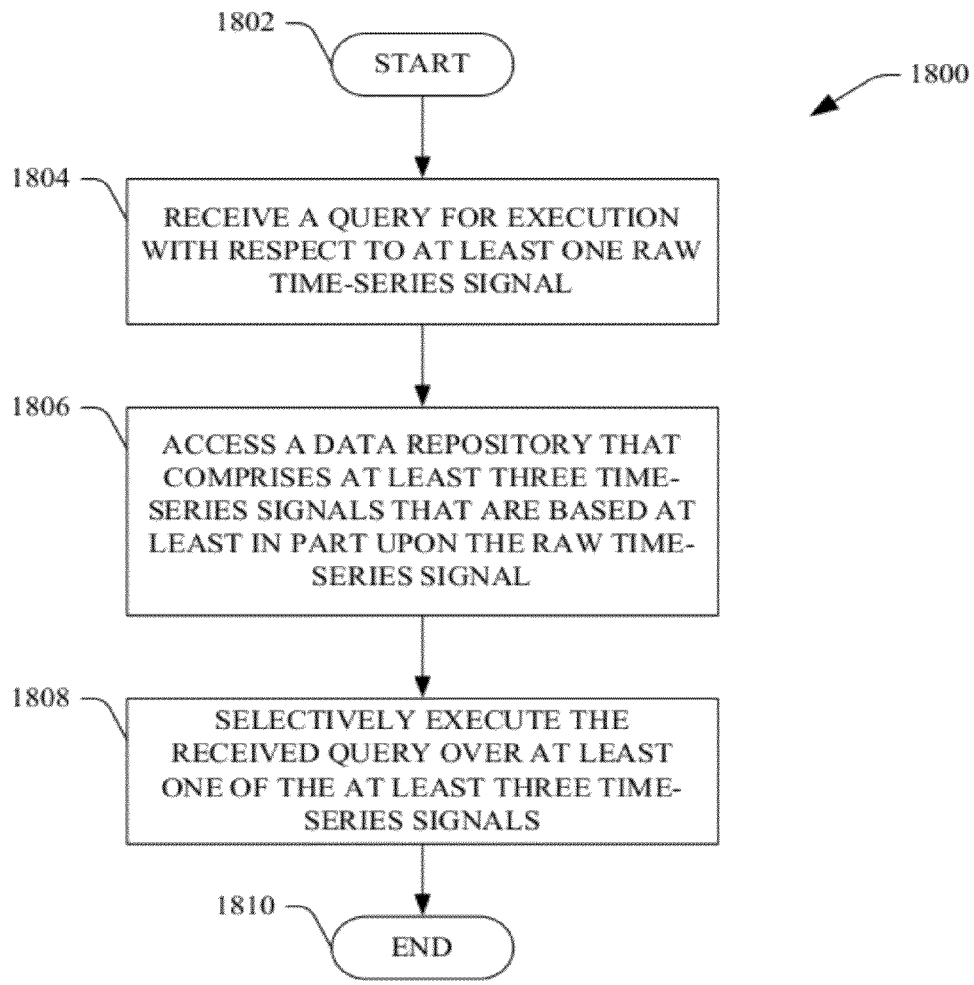
FIG. 18 is a flow diagram that illustrates an example methodology for executing a received query over at least one compressed representation of a portion of a raw time-series signal.
Figure 19:
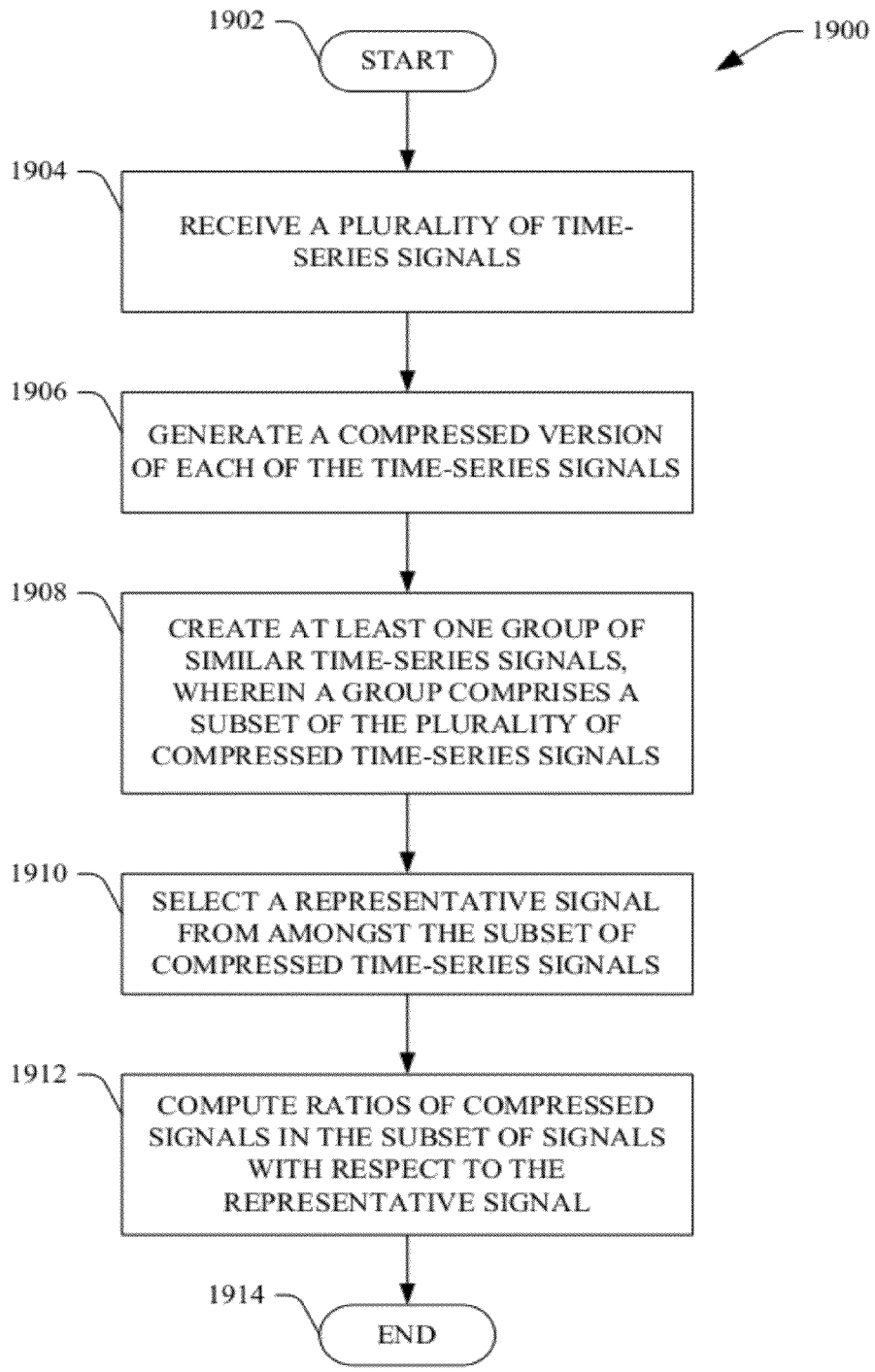
FIG. 19 is a flow diagram that illustrates an example methodology for compressing groups of time-series signals.

With reference now to FIGS. 18-19, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 18, an example methodology 1800 that facilitates querying time-series data is illustrated. The methodology 1800 starts at 1802, and at 1804 a query is received for execution with respect to at least one raw time-series signal. For instance, the query can pertain to determining a trend pertaining to the raw time-series signal, generating a histogram pertaining to the raw time-series signal, or determining a correlation pertaining to the raw time-series signal.

At 1806, a data repository is accessed that includes at least three time-series signals that are based at least in part upon the raw time-series signal. For instance, the three time-series signals can be compressions of certain portions of the raw time-series signal. The three time-series signals can include a first time-series signal that is based at least in part upon execution of a low-pass filter over the raw time-series signal, a second time-series signal that is based at least in part upon a difference between the raw time-series signal and the first time-series signal, and a third time-series signal that is representative of frequencies in the raw time-series signal that are existent in the raw time-series signal but lacking in the first time-series signal and the second time-series signal.

At 1808, the query is selectively executed over at least one of the first time-series signal, the second time-series signal, or the third time-series signal. Execution of the query can cause output results to be displayed on a display screen of a computing device. The methodology 1800 completes at 1810.

With reference now to FIG. 19, an example methodology 1900 that facilitates compressing time-series signals in groups of time-series signals is illustrated. The methodology 1900 starts at 1902, and at 1904 a plurality of time-series signals are received. Such time-series signals can be raw time-series signals, compressed time-series signals, etc.

At 1906, a compressed version of each of the time-series signals is generated (if not already compressed). For instance, constant piecewise linear approximation can be utilized in connection with compressing each of the time-series signals.

At 1908, at least one group of similar time-series signals is generated, wherein the at least one group includes a subset of the plurality of compressed time-series signals. For example, the group can be selected through utilization of a mapping of a facility location problem to grouping similar signals.

At 1910, a representative signal from the subset of compressed time-series signals is selected. For instance, the representative signal can be selected during grouping of signals.

At 1912, ratios of compressed signals in the subset of signals are computed with respect to the representative signal. Thus, the compressed group of time-series signals can include the representative signal and multiple ratio signals. The methodology 1900 completes at 1914.

Figure 20:
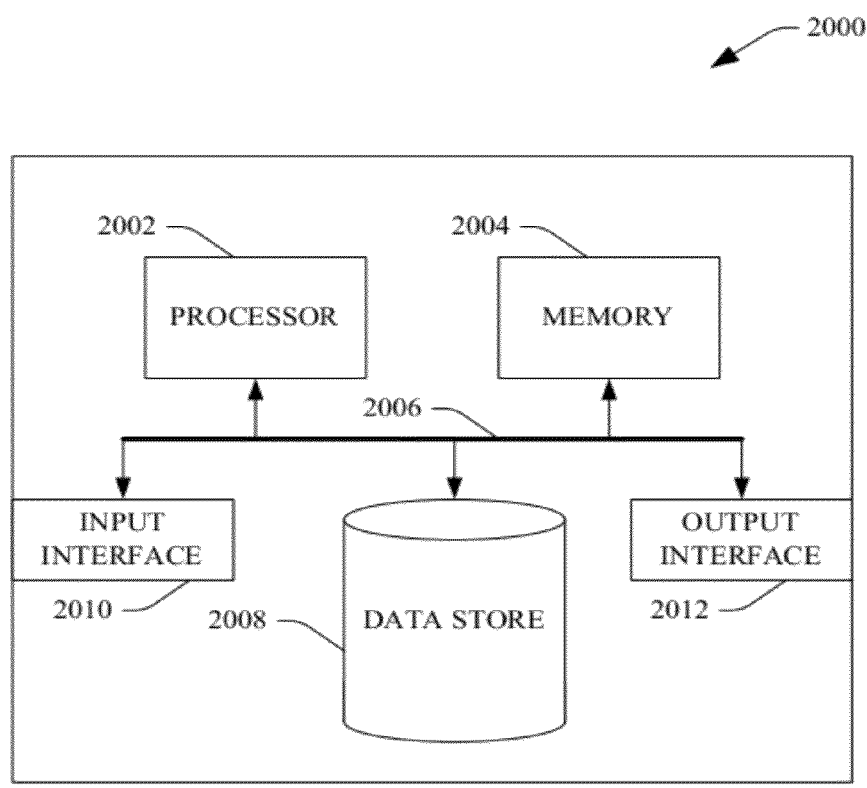
FIG. 20 is an example computing system.

Now referring to FIG. 20, a high-level illustration of an example computing device 2000 that can be used in accordance with the systems and methodologies disclosed herein is illustrated. For instance, the computing device 2000 may be used in a system that supports compressing time-series signals. In another example, at least a portion of the computing device 2000 may be used in a system that supports querying over compressed time-series signals. The computing device 2000 includes at least one processor 2002 that executes instructions that are stored in a memory 2004. The instructions may be, for instance, instructions for implementing functionality described as being carried out by one or more components discussed above or instructions for implementing one or more of the methods described above. The processor 2002 may access the memory 2004 by way of a system bus 2006. In addition to storing executable instructions, the memory 2004 may also store compression algorithms, raw time-series signals, etc.

The computing device 2000 additionally includes a data store 2008 that is accessible by the processor 2002 by way of the system bus 2006. The data store 2008 may include executable instructions, time-series signals, etc. The computing device 2000 also includes an input interface 2010 that allows external devices to communicate with the computing device 2000. For instance, the input interface 2010 may be used to receive instructions from an external computer device, sensors, etc. The computing device 2000 also includes an output interface 2012 that interfaces the computing device 2000 with one or more external devices. For example, the computing device 2000 may display text, images, etc. by way of the output interface 2012.

Additionally, while illustrated as a single system, it is to be understood that the computing device 2000 may be a distributed system. Thus, for instance, several devices may be in communication by way of a network connection and may collectively perform tasks described as being performed by the computing device 2000.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by a computer processor, the method comprising:
   receiving a query for execution with respect to a raw time-series signal, wherein the query pertains to one of determining a trend pertaining to the raw time-series signal, generating a histogram pertaining to the raw time-series signal, or determining a correlation pertaining to the raw time-series signal;
   accessing a data repository that comprises at least three time-series signals that are based at least in part upon the raw time-series signal, wherein the at least three time-series signals are compressions of the raw time-series signal, wherein the at least three time-series signals include:
      a first time-series signal that is based at least in part upon execution of a low-pass filter over the raw time-series signal;
      a second time-series signal that is based at least in part upon a difference between the raw time-series signal and the first time-series signal; and
      a third time-series signal that is representative of frequencies in the raw time-series data that are existent in the raw time-series signal but lacking in the first time-series signal and the second time-series signal; and
   selectively executing the query over at least one of the first time-series signal, the second time-series signal, or the third time-series signal, wherein if the query is for determining the trend pertaining to the raw time-series signal, the query is executed over the first time-series signal, and wherein if the query is for generating the histogram pertaining to the raw time-series signal, the query is executed over the first time-series signal.

2. The method of claim 1, further comprising:
   receiving the raw time-series signal; and
   generating the first time-series signal, the second time-series signal, and the third time-series signal.

3. The method of claim 2, wherein generating the first time-series signal comprises:
   passing the raw time-series data through a low-pass filter to generate a filtered signal; and
   downsampling the filtered signal to generate the first time-series signal.

4. The method of claim 3, wherein generating the second time-series signal comprises:
   subtracting the filtered signal from the raw time-series signal to generate a remainder signal;
   removing samples in the remainder signal that have a value that is below a predefined threshold to generate the second time-series signal.

5. The method of claim 4, wherein generating the third time-series signal comprises:
   compressing a residual of the raw time-series signal to generate the third time-series signal, wherein the residual of the raw time-series signal is the second time-series signal and the filtered signal subtracted from the raw time-series signal.

6. The method of claim 5, wherein random projection is utilized in connection with compressing the residual of the raw time-series signal.

7. The method of claim 3, wherein passing the raw time-series data through the low-pass filter to generate a filtered signal comprises a Fast Fourier Transform on the raw time-series signal and retaining a threshold a threshold number of coefficients of the Fast Fourier Transform.

8. The method of claim 1, further comprising:
utilizing piecewise linear approximation to compress at least one of the first time-series signal, the second time-series signal, or the third time-series signal to generate a compressed signal;
including the compressed signal into a group of similar time-series signals, wherein the group of similar time-series signals comprises a base signal;
generating a ratio signal between the compressed signal and the base signal;
representing signals in the group of similar time-series signals with the base signal and ratio signals; and
utilizing a multiple skip list index in connection with storing the ratio signal.

9. The method of claim 8, further comprising:
receiving a query for execution over a portion of the compressed signal;
utilizing the multiple skip list index to locate a portion of the ratio signal that corresponds to the portion of the compressed signal;
regenerating the portion of the compressed signal by multiplying a portion of the base signal that corresponds to the portion of the compressed signal with the portion of the ratio signal; and
executing the query over the portion of the compressed signal.

10. The method of claim 1, further comprising receiving an indication from an issuer of the query pertaining to which of the first time-series signal, the second time-series signal, or the third time-series signal is to be accessed when executing the query.

11. A system comprising:
a processor; and
a memory that comprises a plurality of components that are executed by the processor, the plurality of components comprising:
a receiver component that receives a query that pertains to a raw time-series signal; and
a query executor component that selectively executes the query over at least one of multiple available compressed representations of the raw time-series signal, the multiple available compressed representations of the raw time-series signal comprising:
a first time-series signal that is based at least in part upon execution of a low-pass filter over the raw time-series signal;
a second time-series signal that is based at least in part upon a difference between the raw time-series signal and the first time-series signal; and
a third time-series signal that is representative of frequencies in the raw time-series data that are existent in the raw time-series signal but lacking in the first time-series signal and the second time-series signal, wherein the query pertains to at least one of determining a trend pertaining to the raw time-series signal, generating a histogram pertaining to the raw time-series signal, or determining a correlation pertaining to the raw time-series signal, wherein the query executor component selects the at least one of the multiple available compressed representations of the raw time-series signals for executing the query thereover based upon whether the query pertains to determining the trend, generating the histogram, or determining the correlation, wherein if the query is for determining the trend pertaining to the raw time-series signal, the query is executed over the first time-series signal, and wherein if the query is for generating the histogram pertaining to the raw time-series signal, the query is executed over the first time-series signal.

12. The system of claim 11, wherein the first time-series signal is generated by way of downsampling an output of the low-pass filter.

13. The system of claim 11, wherein the third time-series signal is compressed through utilization of a random projection.

14. The system of claim 11, wherein the raw time-series signal is representative of data obtained from a data center.

15. A computer-readable data storage device comprising instructions that, when executed by a processor, cause the processor to perform the following acts:
receive a query pertaining to a raw time-series signal, wherein the query pertains to one of determining a trend pertaining to the raw time-series signal, generating a histogram pertaining to the raw time-series signal, or determining a correlation pertaining to the raw time-series signal;
accessing a data repository that comprises at least three time-series signals that are based at least in part upon the raw time-series signal, wherein the at least three time-series signals are compressions of the raw time-series signal, and wherein the at least three time-series signals include:
a first time-series signal, wherein the first time-series is generated by:
passing the raw time-series data through a low-pass filter to generate a filtered signal; and
downsampling the filtered signal to generate the first time-series signal;
a second time-series signal, wherein the second time-series signal is generated by:
subtracting the filtered signal from the raw time-series signal to generate a remainder signal; and
removing samples in the remainder signal that have a value that is below
a predefined threshold to generate the second time-series signal; and
a third time-series signal, wherein the third time-series signal is generated by compressing a residual of the raw time-series signal to generate the third time-series signal, wherein the residual of the raw time-series signal is the second time-series signal and the filtered signal subtracted from the raw time-series signal; and
selectively executing the query over one of the first time-series signal, the second time-series signal, or the third time-series signal to cause output results to be displayed on a display screen of a computing device.

* * * * *